US010382369B2

(12) United States Patent
Schubert et al.

(10) Patent No.: US 10,382,369 B2
(45) Date of Patent: *Aug. 13, 2019

(54) OPERATIONAL SAFETY MODE

(71) Applicant: Apple Inc., Cupertino, CA (US)

(72) Inventors: Emily Clark Schubert, San Jose, CA (US); Todd Blocksom, Brier, WA (US); Andre M J Boule, San Jose, CA (US); Richard R. Dellinger, San Jose, CA (US); Craig M. Federighi, Los Altos Hills, CA (US); Matthew Elliot Shepherd, Mountain View, CA (US); Garrett L. Weinberg, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,686

(22) Filed: Feb. 19, 2019

(65) Prior Publication Data

US 2019/0190858 A1 Jun. 20, 2019

Related U.S. Application Data

(63) Continuation of application No. 15/981,308, filed on May 16, 2018.

(60) Provisional application No. 62/507,115, filed on May 16, 2017.

(51) Int. Cl.
*H04L 12/58* (2006.01)
*H04W 4/12* (2009.01)

(52) U.S. Cl.
CPC .............. *H04L 51/02* (2013.01); *H04L 51/24* (2013.01); *H04W 4/12* (2013.01)

(58) Field of Classification Search
CPC .......... H04W 4/021; H04W 4/02; H04W 4/14
USPC .............................. 455/414.1, 418, 419, 466
See application file for complete search history.

(56) References Cited

U.S. PATENT DOCUMENTS

| 8,706,143 | B1 | 4/2014 | Elias |
| 2010/0062788 | A1 | 3/2010 | Nagorniak |
| 2010/0216509 | A1 | 8/2010 | Riemer et al. |
| 2011/0275321 | A1 | 11/2011 | Zhou et al. |
| 2013/0127614 | A1 | 5/2013 | Velusamy |
| 2013/0316737 | A1 | 11/2013 | Guba et al. |
| 2014/0043135 | A1 | 2/2014 | Kotecha et al. |
| 2015/0163341 | A1 | 6/2015 | Skovron et al. |
| 2015/0271110 | A1 | 9/2015 | Murray |
| 2015/0373666 | A1 | 12/2015 | Malahy et al. |
| 2016/0050315 | A1 | 2/2016 | Malhotra et al. |
| 2016/0205246 | A1 | 7/2016 | Sim et al. |

(Continued)

FOREIGN PATENT DOCUMENTS

WO 2014/173189 A1 10/2014

OTHER PUBLICATIONS

International Search Report and Written Opinion received for PCT Patent Application No. PCT/US2018/032840, dated Jul. 30, 2018, 18 pages.

(Continued)

*Primary Examiner* — Sam Bhattacharya
(74) *Attorney, Agent, or Firm* — Dentons US LLP

(57) ABSTRACT

The present disclosure generally relates to implementing an operational safety mode that manages the output of notifications at an electronic device when a user of the device is operating a vehicle.

48 Claims, 30 Drawing Sheets

(56) References Cited

U.S. PATENT DOCUMENTS

2017/0158200 A1* 6/2017 Wu ................. B60W 30/18163
2018/0337870 A1 11/2018 Schubert et al.

OTHER PUBLICATIONS

Non-Final Office Action received for U.S. Appl. No. 15/981,308, dated Jul. 5, 2018, 7 pages.
Notice of Allowance received for U.S. Appl. No. 15/981,308, dated Dec. 4, 2018, 7 pages.
Office Action received for Danish Patent Application No. PA201770413, dated Jul. 20, 2018, 4 pages.
Office Action received for Danish Patent Application No. PA201770414, dated Jul. 20, 2018, 2 pages.
Search Report and Opinion received for Danish Patent Application No. PA201770413, dated Sep. 21, 2017, 9 pages.
Search Report and Opinion received for Danish Patent Application No. PA201770414, dated Sep. 21, 2017, 9 pages.
"Visual-Manual NHTSA Driver Distraction Guidelines for Portable and Aftermarket Devices", Department of Transportation, National Highway Traffic Safety Administration, available at https://www.nhtsa.gov/staticfiles/rulemaking/pdf/Distraction_Phase_2_FR_Notice_11-21-16_final.pdf, Nov. 21, 2016, 96 pages.
Office Action received for Danish Patent Application No. PA201770413, dated Mar. 14, 2019, 3 pages.
Office Action received for Danish Patent Application No. PA201770414, dated Mar. 14, 2019, 4 pages.

* cited by examiner

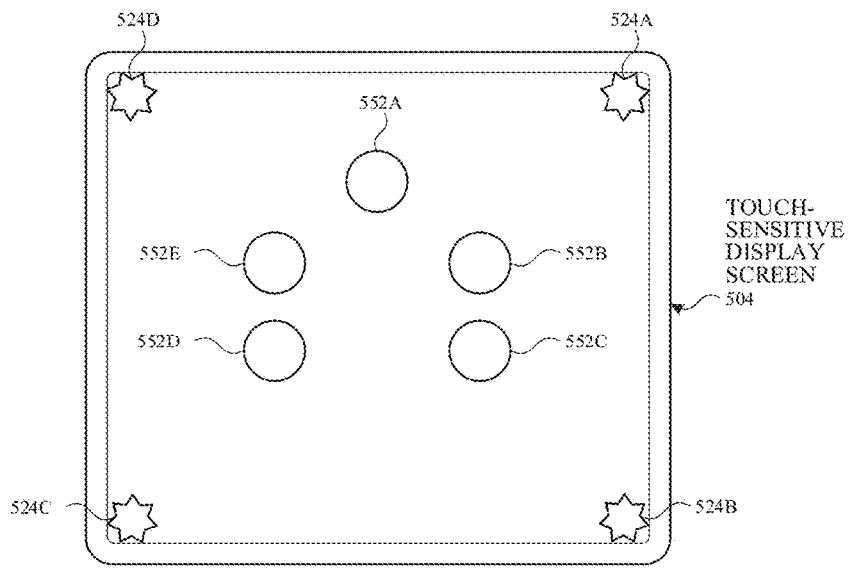
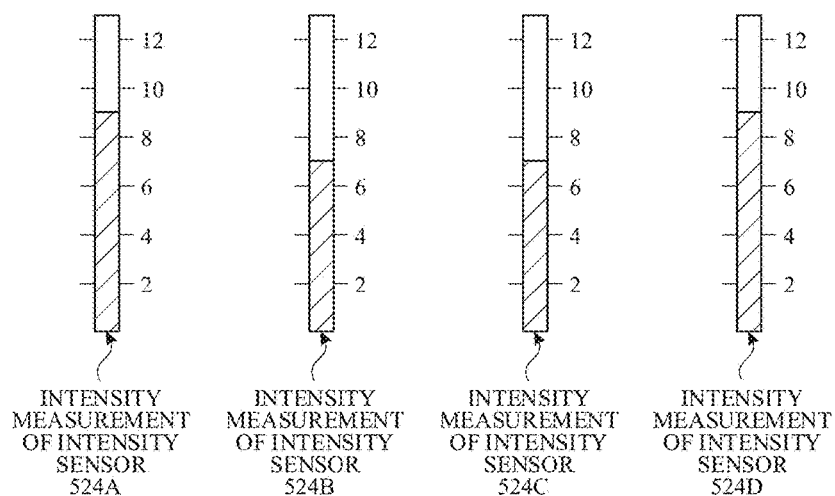
FIG. 5C

OPERATIONAL SAFETY MODE

CROSS-REFERENCE TO RELATED APPLICATIONS

This application is a continuation of U.S. patent application Ser. No. 15/981,308, entitled "OPERATIONAL SAFETY MODE," which claims priority to U.S. Provisional Patent Application No. 62/507,115, entitled "OPERATIONAL SAFETY MODE," filed on May 16, 2017, the contents of which are hereby incorporated by reference in their entireties.

FIELD

The present disclosure relates generally to electronic devices, and more specifically to techniques for operating the electronic device in various modes in various situations.

BACKGROUND

Electronic devices can receive information, including, merely by way of example, communications from other users' electronic devices and/or applications. Such electronic devices can output notifications indicating the arrival of information.

BRIEF SUMMARY

Some operational modes involving the output of notifications using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing the output of notifications. Such methods and interfaces optionally complement or replace other methods for managing the output of notifications. Such methods and interfaces reduce the cognitive burden on a user and produce a more efficient human-machine interface. For battery-operated computing devices, such methods and interfaces conserve power and increase the time between battery charges. For battery-operated computing devices, such methods and interfaces conserve power and increase the time between battery charges. For example, the methods and interfaces contemplated herein offer reduced processing power, reduced memory usage, and reduced battery usage by a display at the device.

Example methods are disclosed herein. An example method includes, at an electronic device with a display: detecting one or more contextual parameters; in accordance with the one or more contextual parameters satisfying operational safety mode initiation criteria, including a criterion that is satisfied when the contextual parameters are indicative of the electronic device being situated within an operating motor vehicle, initiating an operational safety mode; while the device is in the operational safety mode: receiving a notification; in accordance with a determination that the notification satisfies a set of notification output criteria, causing output corresponding to the notification; and in accordance with a determination that the notification does not satisfy the set of notification output criteria, forgoing causing output corresponding to the notification.

An example method includes, at an electronic device with a display: while in an operational safety mode: receiving a communication from a contact; in accordance with a determination that the communication satisfies notification output criteria, including a criterion that is satisfied when the communication includes a notification output request, outputting a notification corresponding to the communication; and in accordance with a determination that the communication does not satisfy the notification output criteria, forgoing outputting the notification.

An example method includes, while a first set of operational safety mode initiation criteria of a plurality of sets of operational safety mode initiation criteria is active, the first set of operational safety mode initiation criteria including a criterion that is satisfied when movement of the electronic device exceeds a threshold movement value: detecting a first set of one or more contextual parameters; in response to detecting the first set of one or more contextual parameters: in accordance with a determination that the first set of contextual parameters satisfy the first set of operational safety mode initiation criteria, initiating the operational safety mode; while a second set of operational safety mode initiation criteria of the plurality of sets of operational safety mode initiation criteria is active, the second set of operational safety mode initiation criteria including a criterion that is satisfied when the electronic device is connected to a second electronic device associated with a motor vehicle: detecting a second set of one or more contextual parameters; in response to detecting the second set of one or more contextual parameters: in accordance with a determination that the second set of contextual parameters satisfy the second set of operational safety mode initiation criteria, initiating the operational safety mode; in accordance with a determination that the second set of contextual parameters do not satisfy the second set of operational safety mode initiation criteria, while satisfying the first set of operational safety mode initiation criteria, forgoing initiating the operational safety mode.

Example devices are disclosed herein. An example electronic device includes a display; one or more processors; and memory storing one or more programs configured to be executed by the one or more processors, the one or more programs including instructions for: detecting one or more contextual parameters; in accordance with the one or more contextual parameters satisfying operational safety mode initiation criteria, including a criterion that is satisfied when the contextual parameters are indicative of the electronic device being situated within an operating motor vehicle, initiating an operational safety mode; while the device is in the operational safety mode: receiving a notification; in accordance with a determination that the notification satisfies a set of notification output criteria, causing output corresponding to the notification; and in accordance with a determination that the notification does not satisfy the set of notification output criteria, forgoing causing output corresponding to the notification.

An example electronic device includes a display; one or more processors; and memory storing one or more programs configured to be executed by the one or more processors, the one or more programs including instructions for: while in an operational safety mode: receiving a communication from a contact; in accordance with a determination that the communication satisfies notification output criteria, including a criterion that is satisfied when the communication includes a notification output request, outputting a notification corresponding to the communication; and in accordance with a determination that the communication does not satisfy the notification output criteria, forgoing outputting the notification.

An example electronic device includes a display; one or more processors; and memory storing one or more programs configured to be executed by the one or more processors, the one or more programs including instructions for: while a first set of operational safety mode initiation criteria of a plurality of sets of operational safety mode initiation criteria is active, the first set of operational safety mode initiation criteria including a criterion that is satisfied when movement of the electronic device exceeds a threshold movement value: detecting a first set of one or more contextual parameters; in response to detecting the first set of one or more contextual parameters: in accordance with a determination that the first set of contextual parameters satisfy the first set of operational safety mode initiation criteria, initiating the operational safety mode; while a second set of operational safety mode initiation criteria of the plurality of sets of operational safety mode initiation criteria is active, the second set of operational safety mode initiation criteria including a criterion that is satisfied when the electronic device is connected to a second electronic device associated with a motor vehicle: detecting a second set of one or more contextual parameters; in response to detecting the second set of one or more contextual parameters: in accordance with a determination that the second set of contextual parameters satisfy the second set of operational safety mode initiation criteria, initiating the operational safety mode; in accordance with a determination that the second set of contextual parameters do not satisfy the second set of operational safety mode initiation criteria, while satisfying the first set of operational safety mode initiation criteria, forgoing initiating the operational safety mode.

Example non-transitory computer-readable storage media are disclosed herein. An example non-transitory computer-readable storage medium stores one or more programs configured to be executed by one or more processors of an electronic device with a display, the one or more programs including instructions for: detecting one or more contextual parameters; in accordance with the one or more contextual parameters satisfying operational safety mode initiation criteria, including a criterion that is satisfied when the contextual parameters are indicative of the electronic device being situated within an operating motor vehicle, initiating an operational safety mode; while the device is in the operational safety mode: receiving a notification; in accordance with a determination that the notification satisfies a set of notification output criteria, causing output corresponding to the notification; and in accordance with a determination that the notification does not satisfy the set of notification output criteria, forgoing causing output corresponding to the notification.

An example non-transitory computer-readable storage medium stores one or more programs configured to be executed by one or more processors of an electronic device with a display, the one or more programs including instructions for: while in an operational safety mode: receiving a communication from a contact; in accordance with a determination that the communication satisfies notification output criteria, including a criterion that is satisfied when the communication includes a notification output request, outputting a notification corresponding to the communication; and in accordance with a determination that the communication does not satisfy the notification output criteria, forgoing outputting the notification.

An example non-transitory computer-readable storage medium stores one or more programs configured to be executed by one or more processors of an electronic device with a display, the one or more programs including instructions for: while a first set of operational safety mode initiation criteria of a plurality of sets of operational safety mode initiation criteria is active, the first set of operational safety mode initiation criteria including a criterion that is satisfied when movement of the electronic device exceeds a threshold movement value: detecting a first set of one or more contextual parameters; in response to detecting the first set of one or more contextual parameters: in accordance with a determination that the first set of contextual parameters satisfy the first set of operational safety mode initiation criteria, initiating the operational safety mode; while a second set of operational safety mode initiation criteria of the plurality of sets of operational safety mode initiation criteria is active, the second set of operational safety mode initiation criteria including a criterion that is satisfied when the electronic device is connected to a second electronic device associated with a motor vehicle: detecting a second set of one or more contextual parameters; in response to detecting the second set of one or more contextual parameters: in accordance with a determination that the second set of contextual parameters satisfy the second set of operational safety mode initiation criteria, initiating the operational safety mode; in accordance with a determination that the second set of contextual parameters do not satisfy the second set of operational safety mode initiation criteria, while satisfying the first set of operational safety mode initiation criteria, forgoing initiating the operational safety mode.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Example transitory computer-readable storage media are disclosed herein. An example non-transitory computer-readable storage medium stores one or more programs configured to be executed by one or more processors of an electronic device with a display, the one or more programs including instructions for: detecting one or more contextual parameters; in accordance with the one or more contextual parameters satisfying operational safety mode initiation criteria, including a criterion that is satisfied when the contextual parameters are indicative of the electronic device being situated within an operating motor vehicle, initiating an operational safety mode; while the device is in the operational safety mode: receiving a notification; in accordance with a determination that the notification satisfies a set of notification output criteria, causing output corresponding to the notification; and in accordance with a determination that the notification does not satisfy the set of notification output criteria, forgoing causing output corresponding to the notification.

An example transitory computer-readable storage medium stores one or more programs configured to be executed by one or more processors of an electronic device with a display, the one or more programs including instructions for: while in an operational safety mode: receiving a communication from a contact; in accordance with a determination that the communication satisfies notification output criteria, including a criterion that is satisfied when the communication includes a notification output request, outputting a notification corresponding to the communication; and in accordance with a determination that the communication does not satisfy the notification output criteria, forgoing outputting the notification.

An example transitory computer-readable storage medium stores one or more programs configured to be executed by one or more processors of an electronic device with a display, the one or more programs including instructions for: while a first set of operational safety mode initiation criteria of a plurality of sets of operational safety mode initiation criteria is active, the first set of operational safety mode initiation criteria including a criterion that is satisfied when movement of the electronic device exceeds a threshold movement value: detecting a first set of one or more contextual parameters; in response to detecting the first set of one or more contextual parameters: in accordance with a determination that the first set of contextual parameters satisfy the first set of operational safety mode initiation criteria, initiating the operational safety mode; while a second set of operational safety mode initiation criteria of the plurality of sets of operational safety mode initiation criteria is active, the second set of operational safety mode initiation criteria including a criterion that is satisfied when the electronic device is connected to a second electronic device associated with a motor vehicle: detecting a second set of one or more contextual parameters; in response to detecting the second set of one or more contextual parameters: in accordance with a determination that the second set of contextual parameters satisfy the second set of operational safety mode initiation criteria, initiating the operational safety mode; in accordance with a determination that the second set of contextual parameters do not satisfy the second set of operational safety mode initiation criteria, while satisfying the first set of operational safety mode initiation criteria, forgoing initiating the operational safety mode.

Thus, devices are provided with faster, more efficient methods and interfaces for managing the output of notifications and providing certain operational modes when certain parameters are detected, thereby increasing the effectiveness, efficiency, and user satisfaction with such devices. Such methods and interfaces may complement or replace other methods for managing the output of notifications providing operational modes.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 5C-5D illustrate exemplary components of a personal electronic device having a touch-sensitive display and intensity sensors in accordance with some embodiments.

FIGS. 6A-6I illustrate examples for an operational safety mode in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for safe operation, such as initiating an operational safety mode based on detected contexts (e.g., environmental contexts), and for methods and interfaces for managing notifications and communications during the operational safety mode to promote safe operation. Such techniques can reduce the cognitive burden on a user who accesses and/or otherwise receives notifications and communications, thereby enhancing productivity and safe usage of the device. Further, such techniques can reduce processor and battery power otherwise wasted on redundant user inputs.

Further, the methods and interfaces disclosed herein promote safe usage of electronic devices under certain situations, such as when the electronic device is in a vehicle (e.g., automobile, motorcycle, aircraft, boat, bicycle, etc.) and the user of the device is operating the vehicle. As described herein, in some examples the device operates in an operational safety mode that reduces the temptation to send and/or receive communications (e.g., text messages, e-mail) and reduces the urge to check the device while driving. In some examples, the operational safety mode is enhanced with custom behaviors tailored to driving experiences to prevent driver distraction while at the same time, preventing the driver from appearing unresponsive to communications from certain users at other electronic devices. In some examples, the device distinguishes whether the device is associated with the driver of the vehicle who may appreciate the operational safety mode or whether the device is associated with a passenger at the vehicle who may not necessarily need the operational safety mode. In another aspect, in some examples, the operational safety mode safe promotes safe usage and custom behaviors by providing user interfaces with larger and/or chunkier tap targets to facilitate interaction and navigation of certain applications when various contexts are detected by and/or associated with the electronic device. In some examples discussed below, the electronic device includes voice control, and during the operational safety mode, the voice control includes a verbose operational mode that provides a higher level of voice guidance, thereby further decreasing the need for the user to glance at the device. In some examples, the operational safety mode locks the device (e.g., locks both user interfaces and voice control) to discourage the user from potentially questionable behavior while certain contexts are detected at the electronic device.

Figure 8:
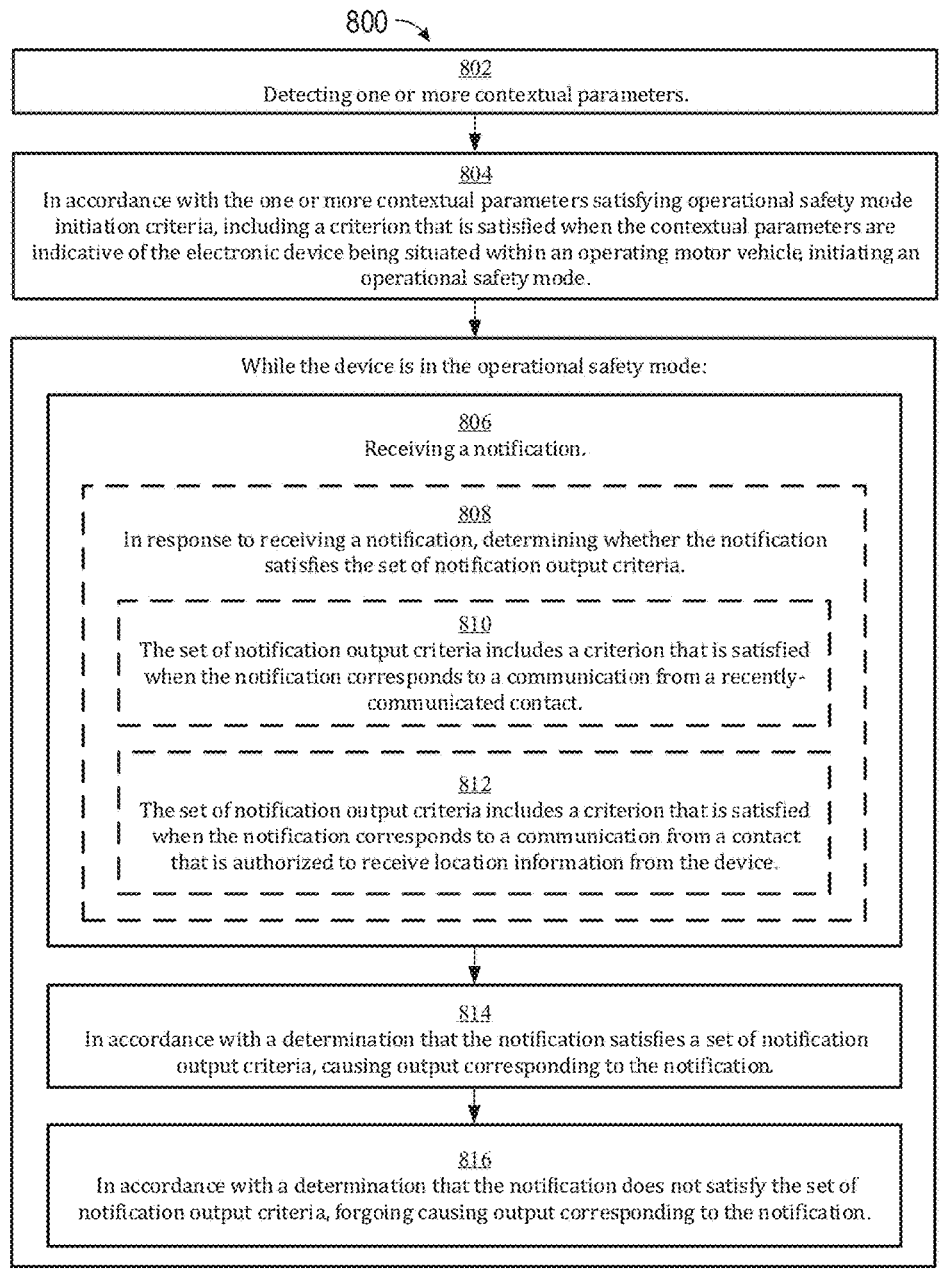
FIG. 8 is a flow diagram illustrating an example method for an operational safety mode, including filtering the output of notifications based on notification output criteria, in accordance with some embodiments.
Figure 9:
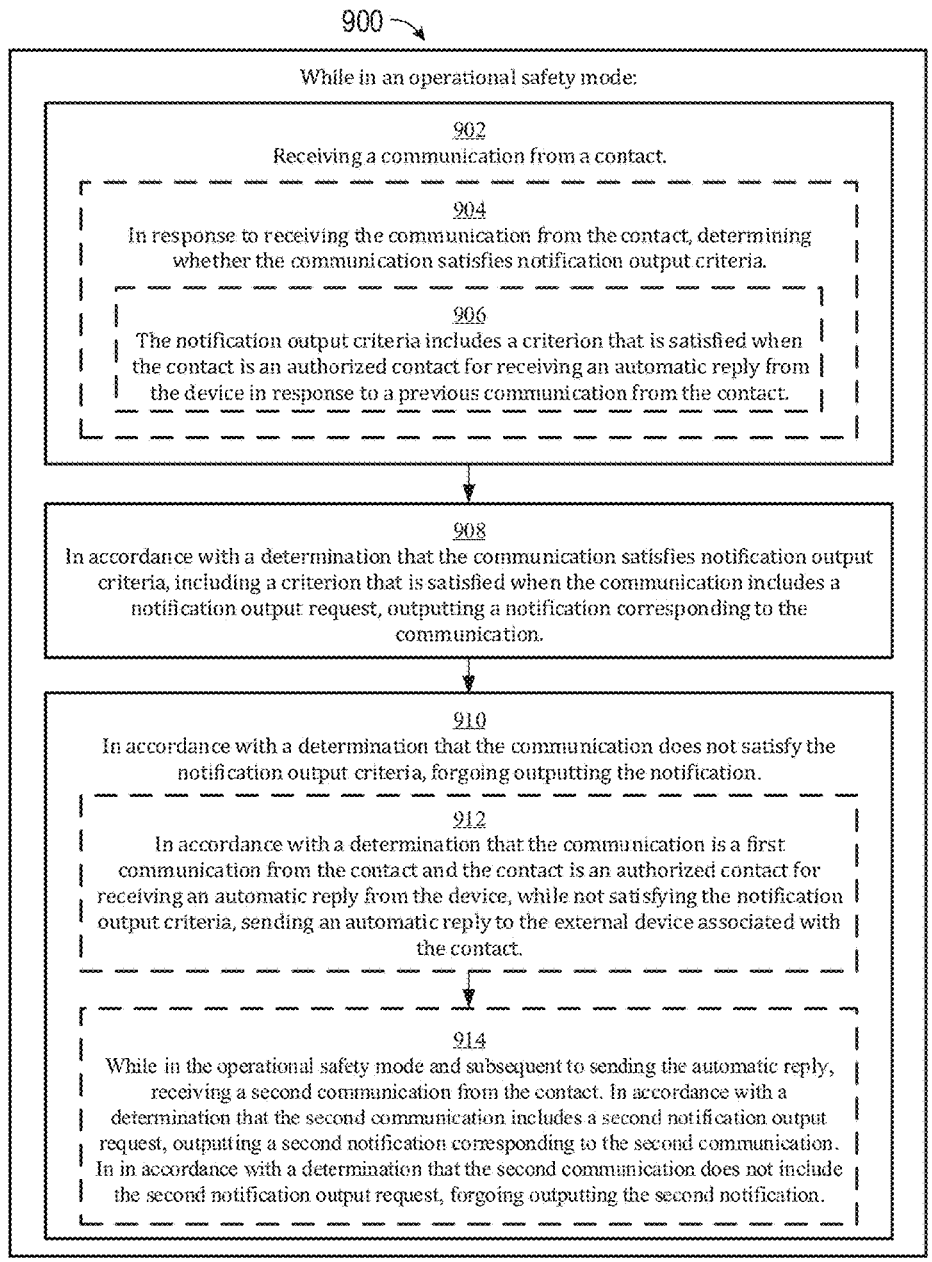
FIG. 9 is a flow diagram illustrating another example method for an operational safety mode, including suppressing the output of notifications that do not satisfy notification output criteria including a criterion for a sender-marked output request, in accordance with some embodiments.
Figure 10:
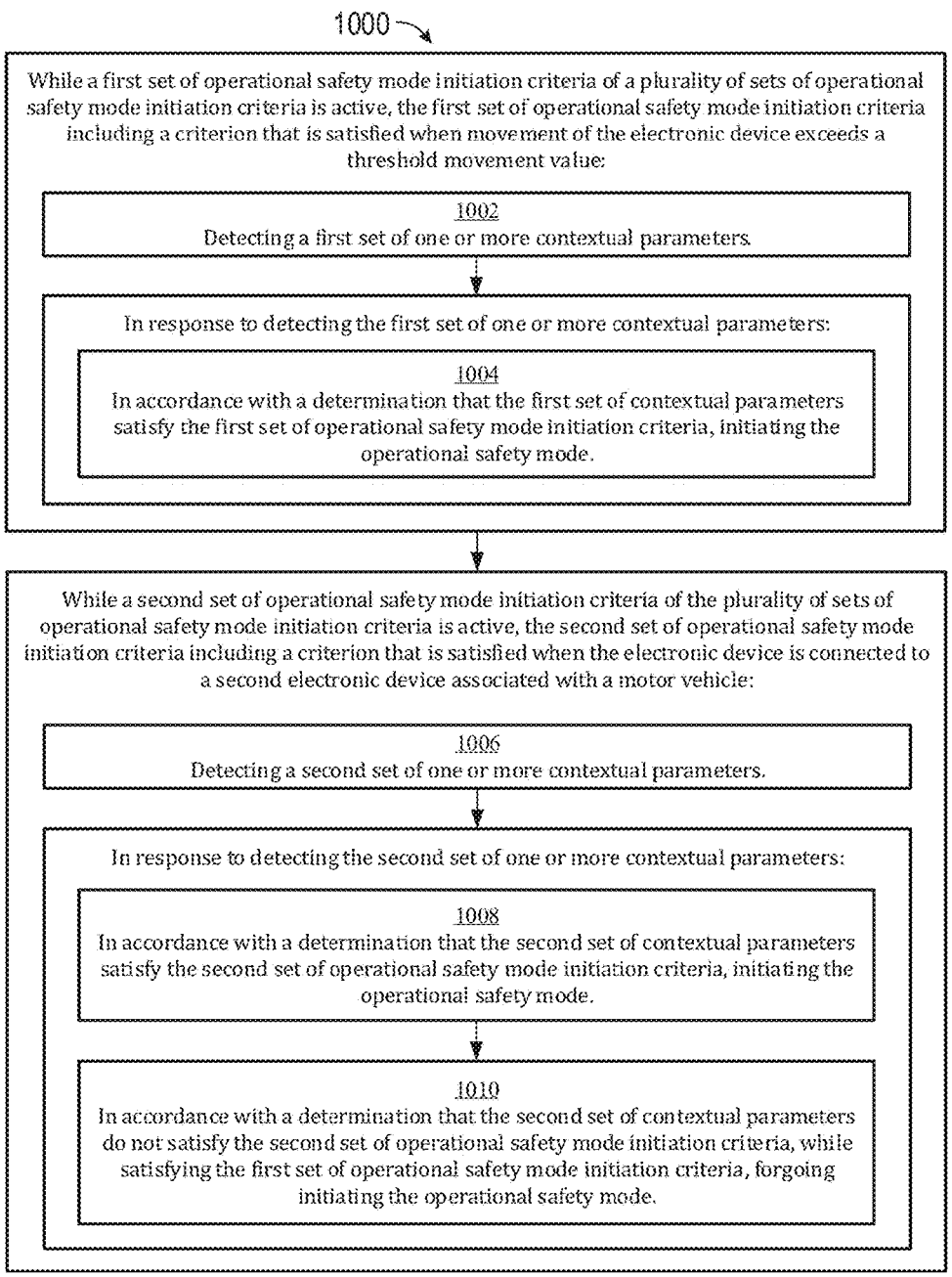
FIG. 10 is a flow diagram illustrating yet another example method for an operational safety mode, including initiating the operational safety mode, in accordance with some embodiments.

Below, FIGS. 1A-1B, 2, 3, 4A-4B, and 5A-5H provide a description of exemplary devices for performing the techniques for an operational safety mode. FIGS. 6A-6I illustrate examples of the operational safety mode. FIGS. 8-10 are flow diagrams illustrating methods for the operational safety mode in accordance with some embodiments. FIGS. 6A-6I are used to illustrate the processes described below, including the processes in FIGS. 8-10. FIGS. 7A-7D illustrate example user interfaces for an operational safety mode. The user interfaces in FIGS. 7A-7D are used to illustrate the processes described below, including the processes in FIGS. 8-10.

This present disclose relates to U.S. Provisional patent application Ser. No. 15/596,592, entitled, "UE Motion Estimate Based on Cellular Parameters," filed on May 16, 2017, which describes systems and techniques related to providing improved motion estimation base on cellular parameters and is hereby incorporated by reference. For example, U.S. Provisional patent application Ser. No. 15/596,592 presents embodiments of user equipment device (UE), and associated methods for enabling the UE to estimate velocity of the UE based on cellular parameters. In some embodiments, a first velocity of a UE may be estimated based on a first set of parameters associated with one or more cellular based metrics. Doppler measurements may be performed in response to the first velocity exceeding a velocity threshold for at least a time period. In some embodiments, performing (or conducting) the doppler measurements may be triggered by (e.g., in response to) the first velocity exceeding the velocity threshold for at least the first time period and receiving an indication from a motion processor of the UE that the UE is in a non-static state. In addition, a second velocity of the UE may be estimated based on the first set of parameters and the dopper measurements.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
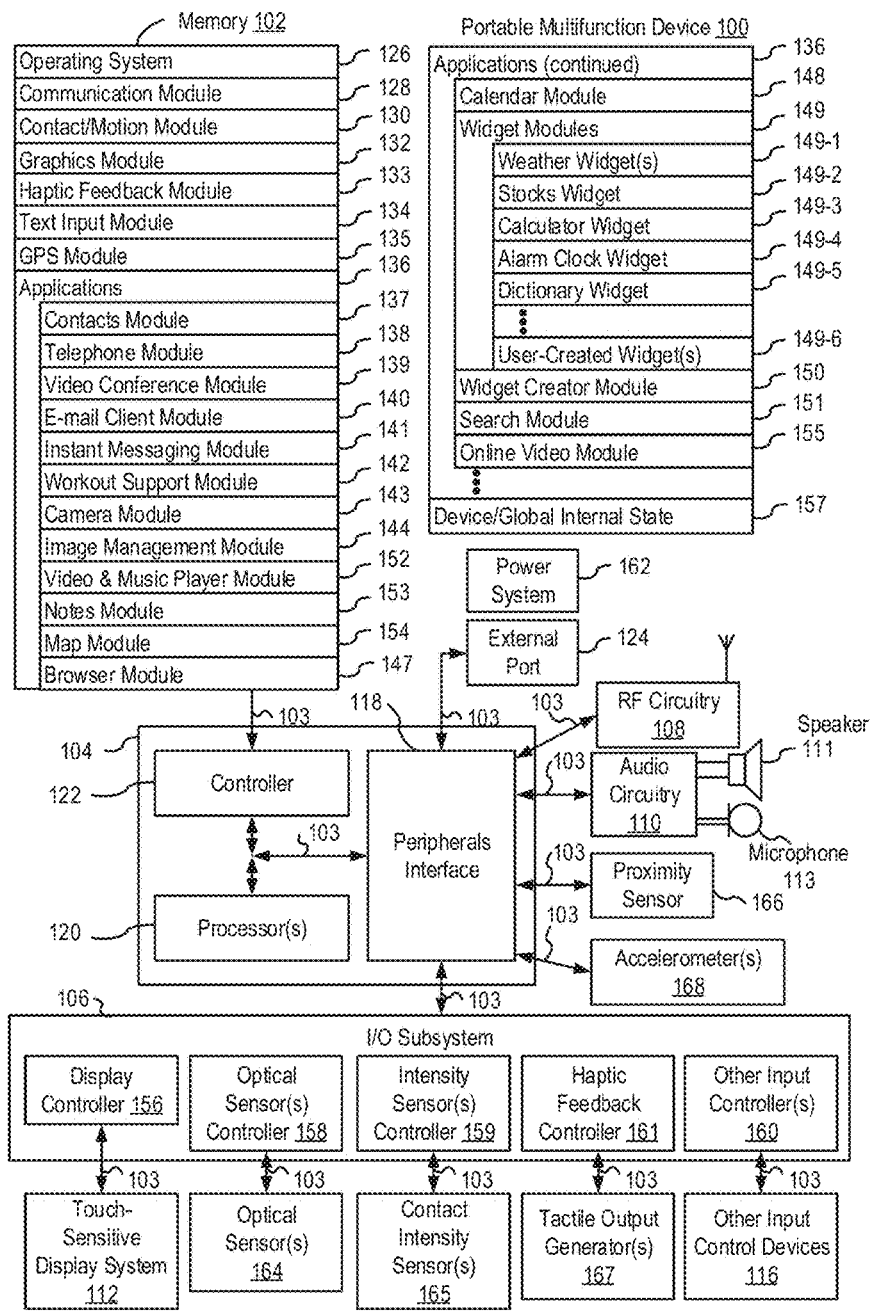
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that is, in some circumstances, otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons is, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
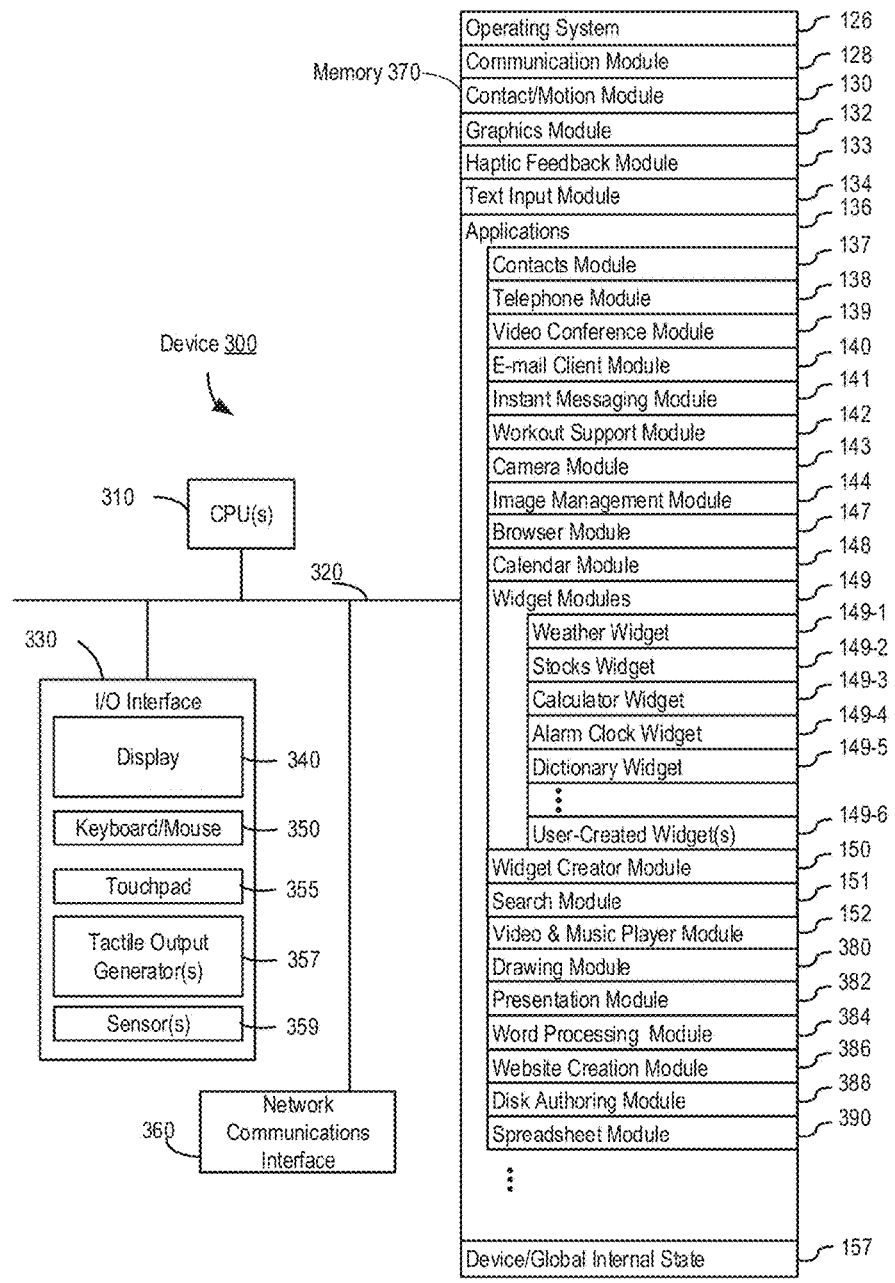
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1,
stocks widget 149-2, calculator widget 149-3, alarm clock widget 149-4, dictionary
widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
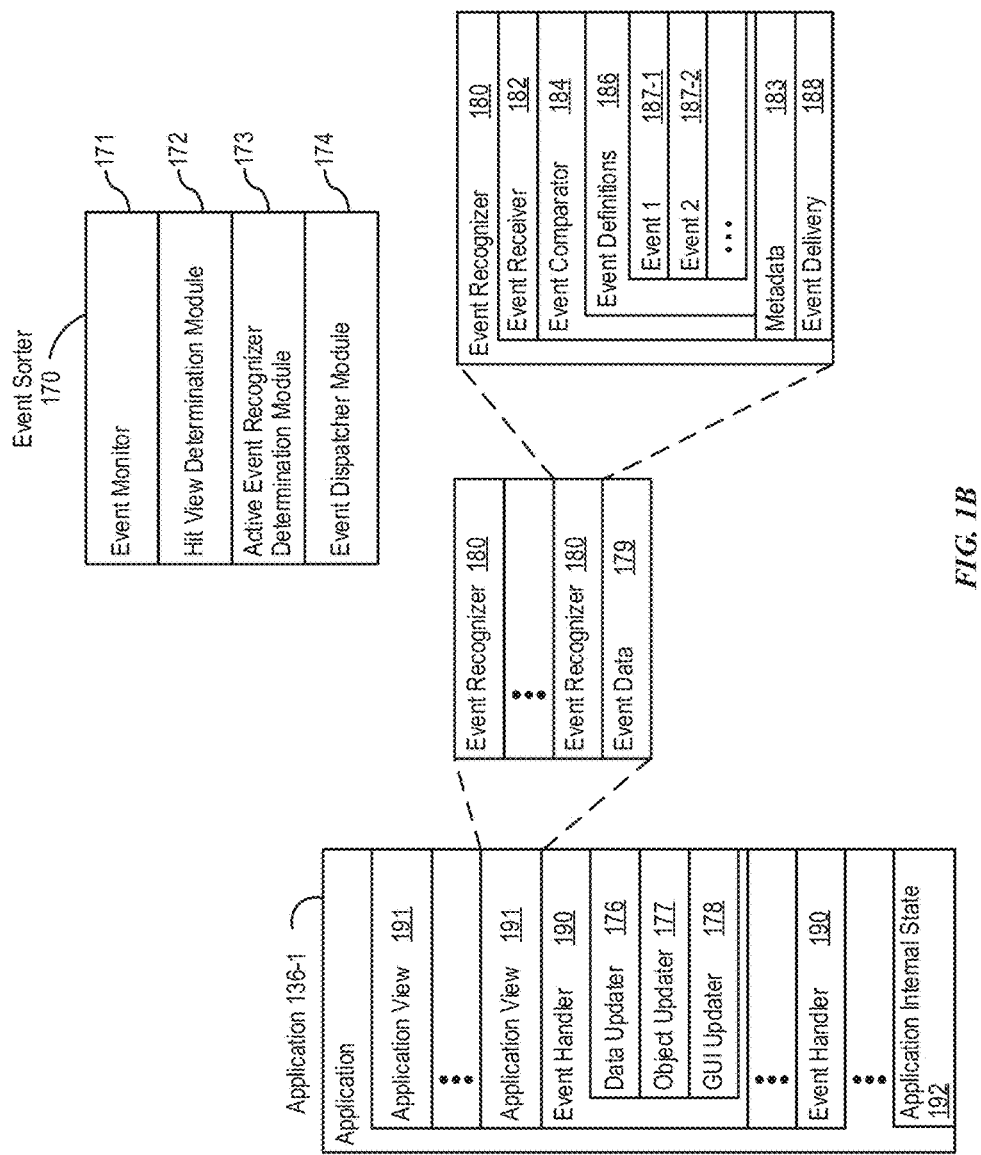
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG.

1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
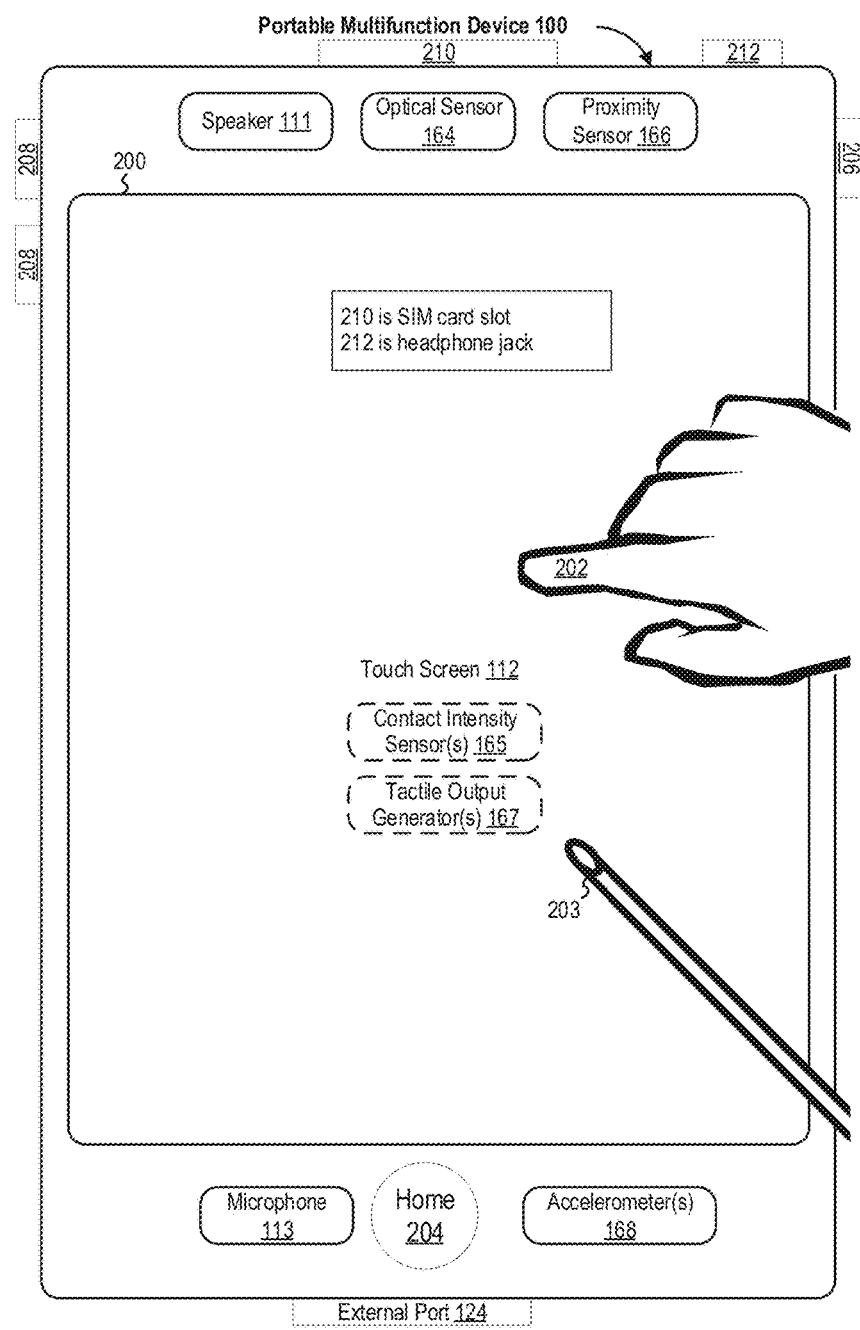
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
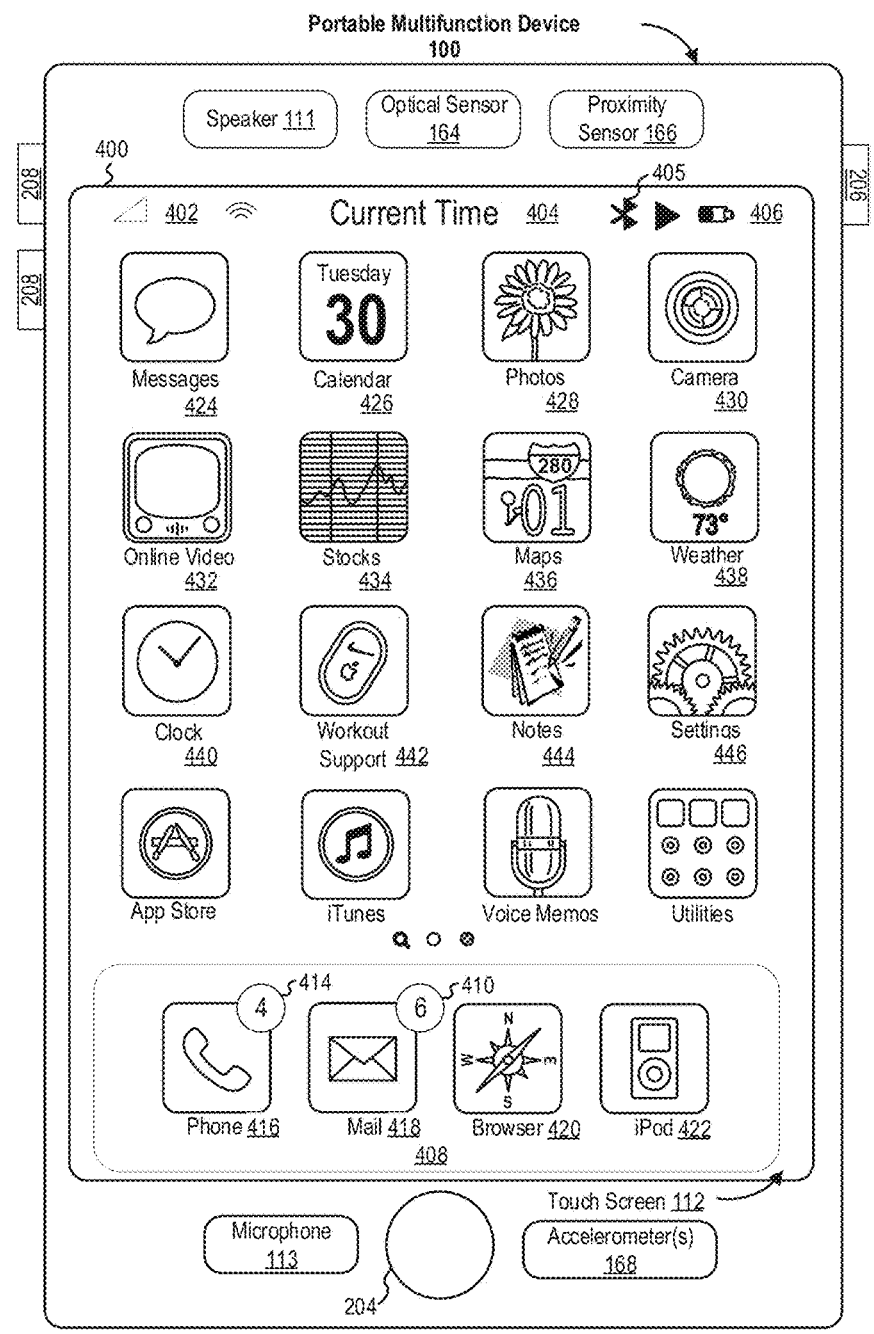
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
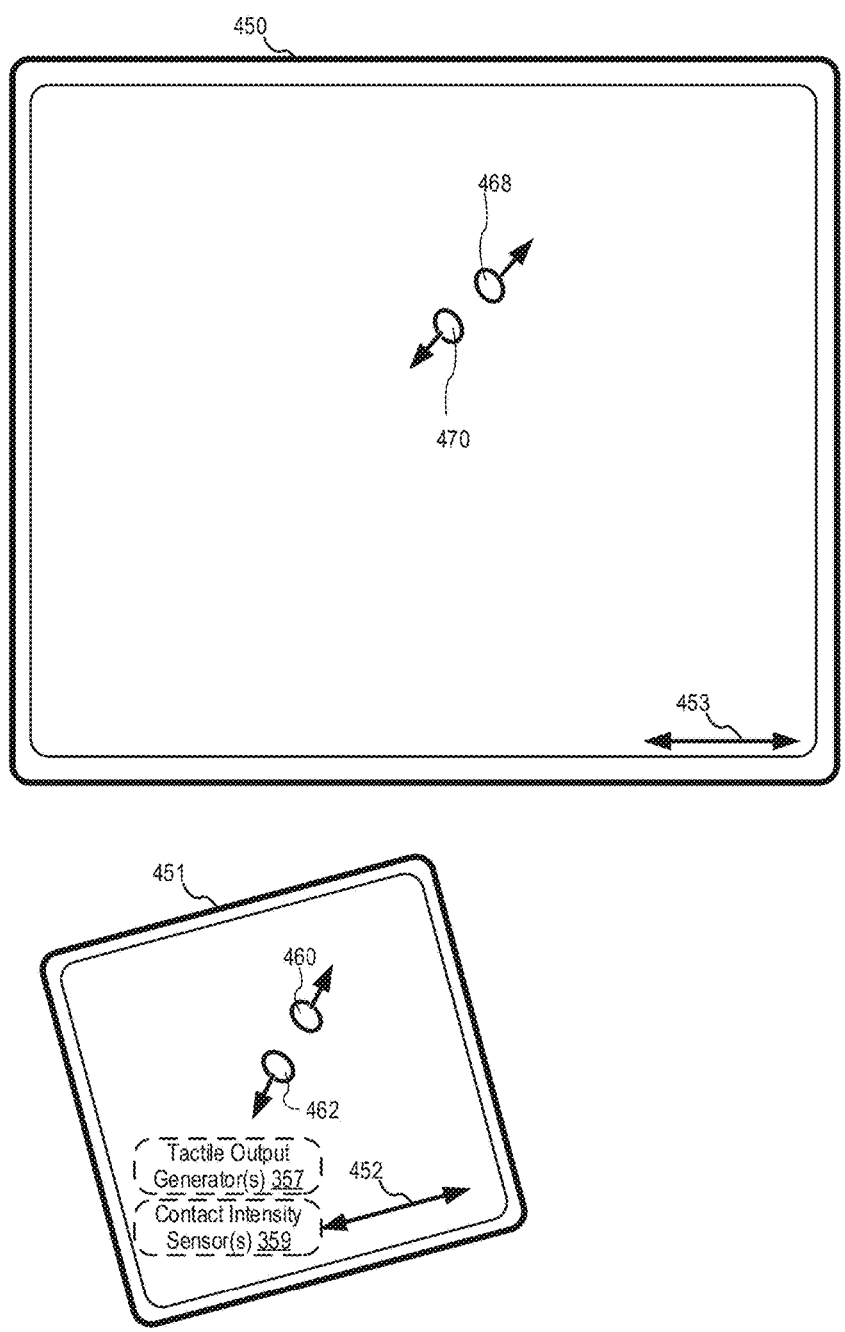
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
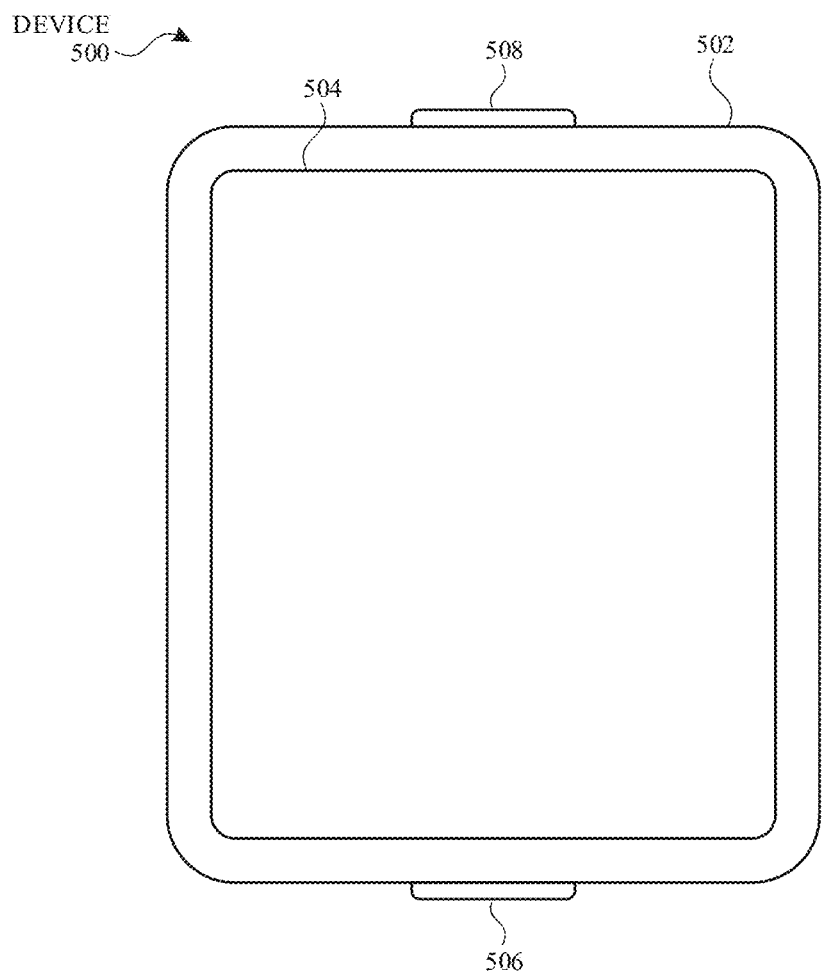
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
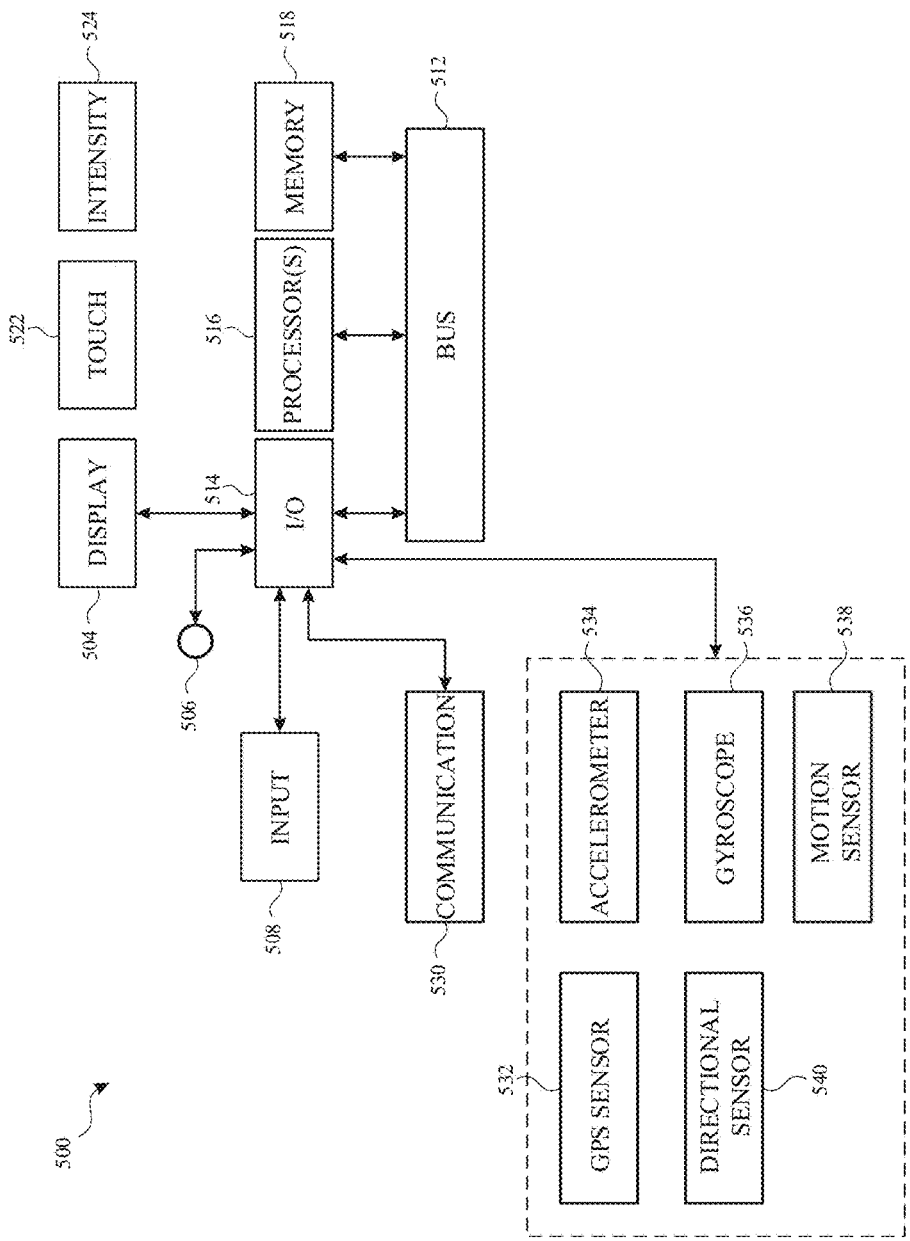
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800-1000 (FIGS. 8-10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
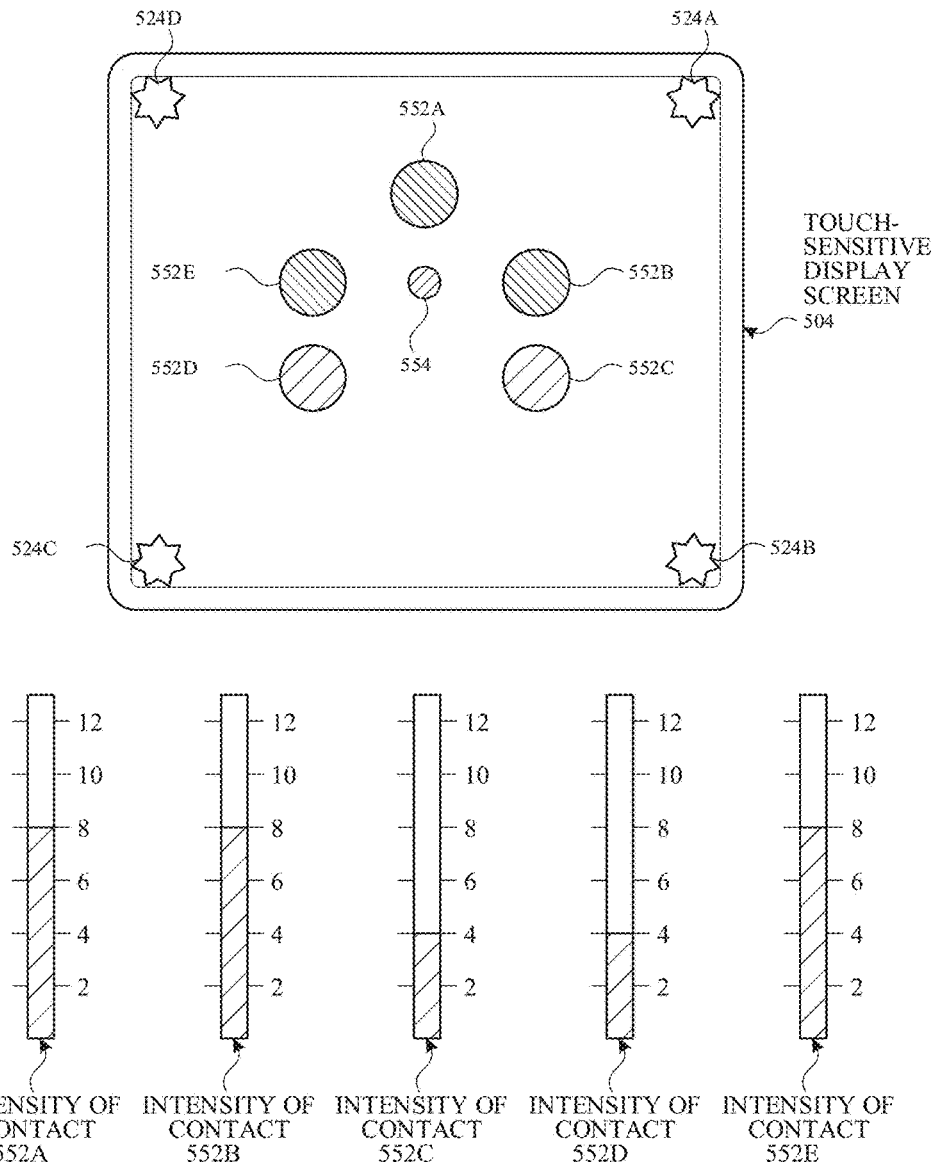

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
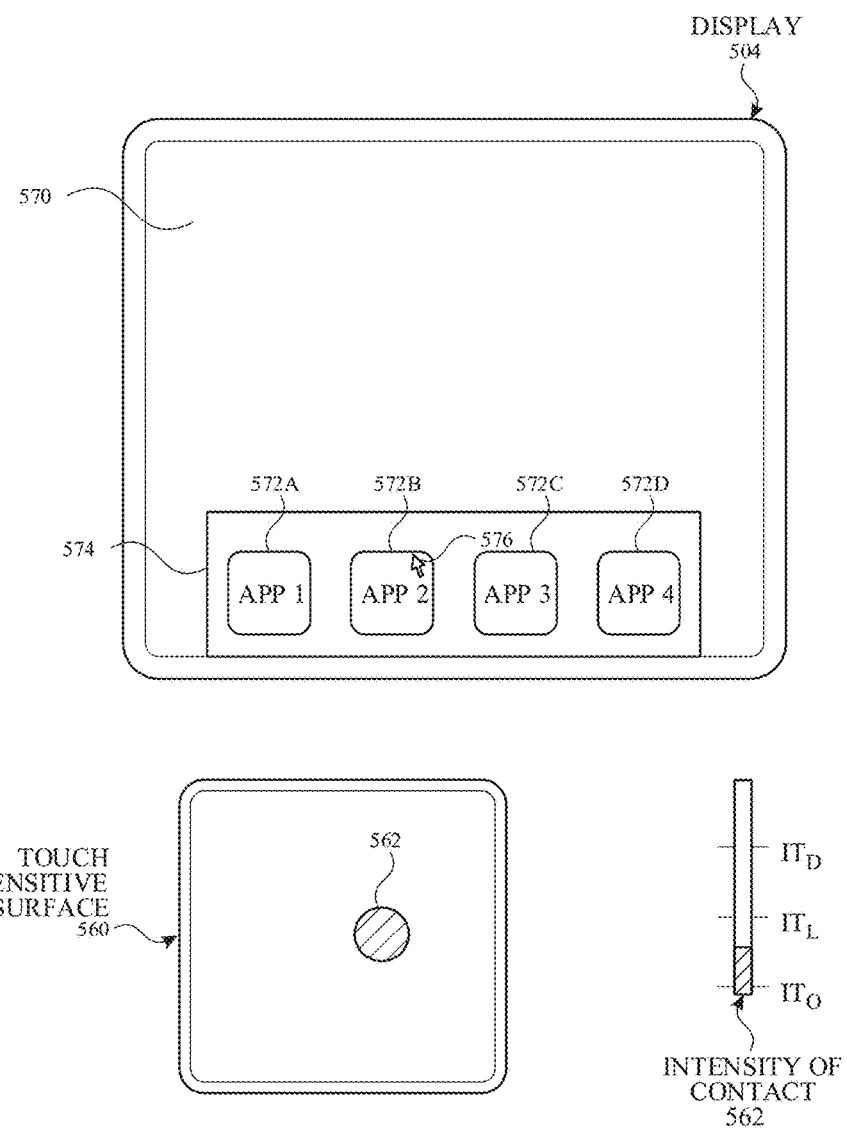
FIGS. 5E-5H illustrate exemplary components and user interfaces of a personal electronic device in accordance with some embodiments.
Figure 5F:
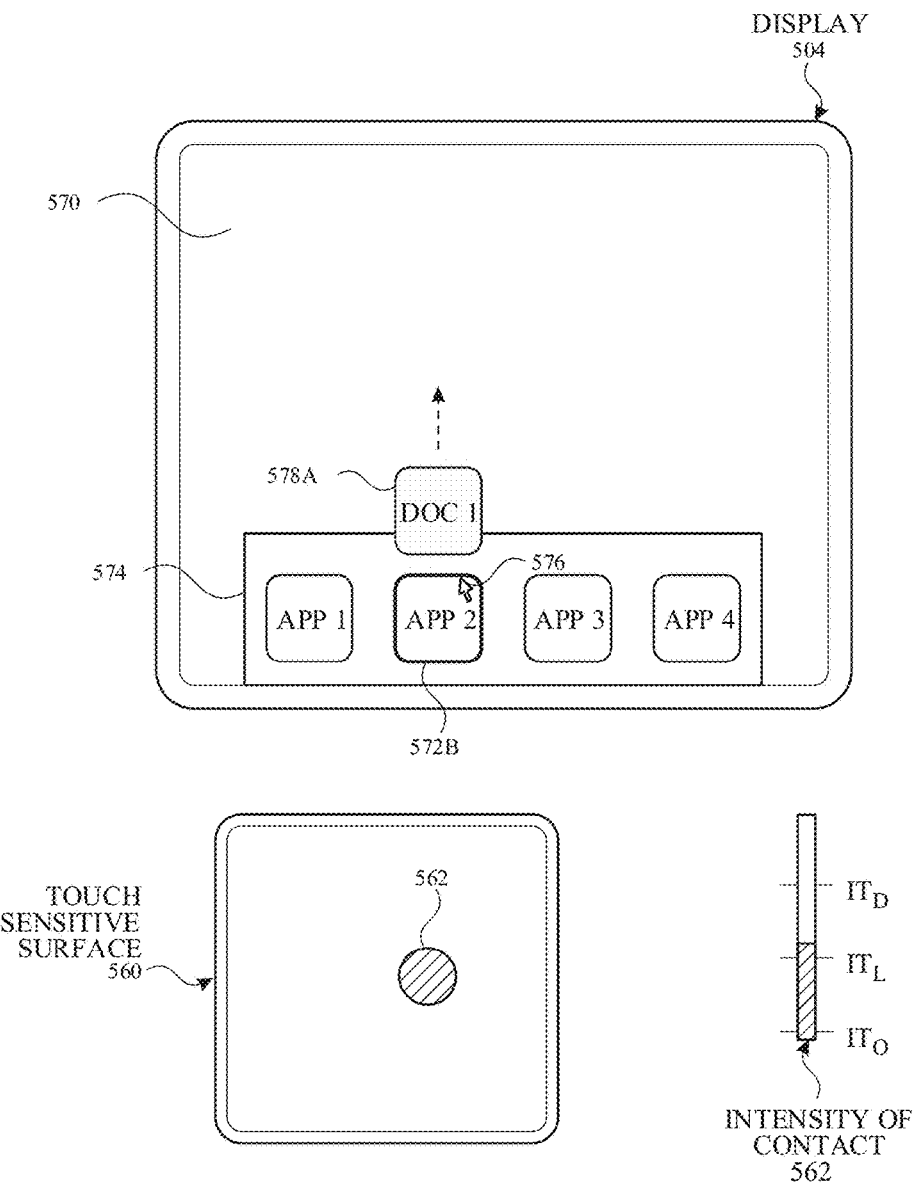
Figure 5G:
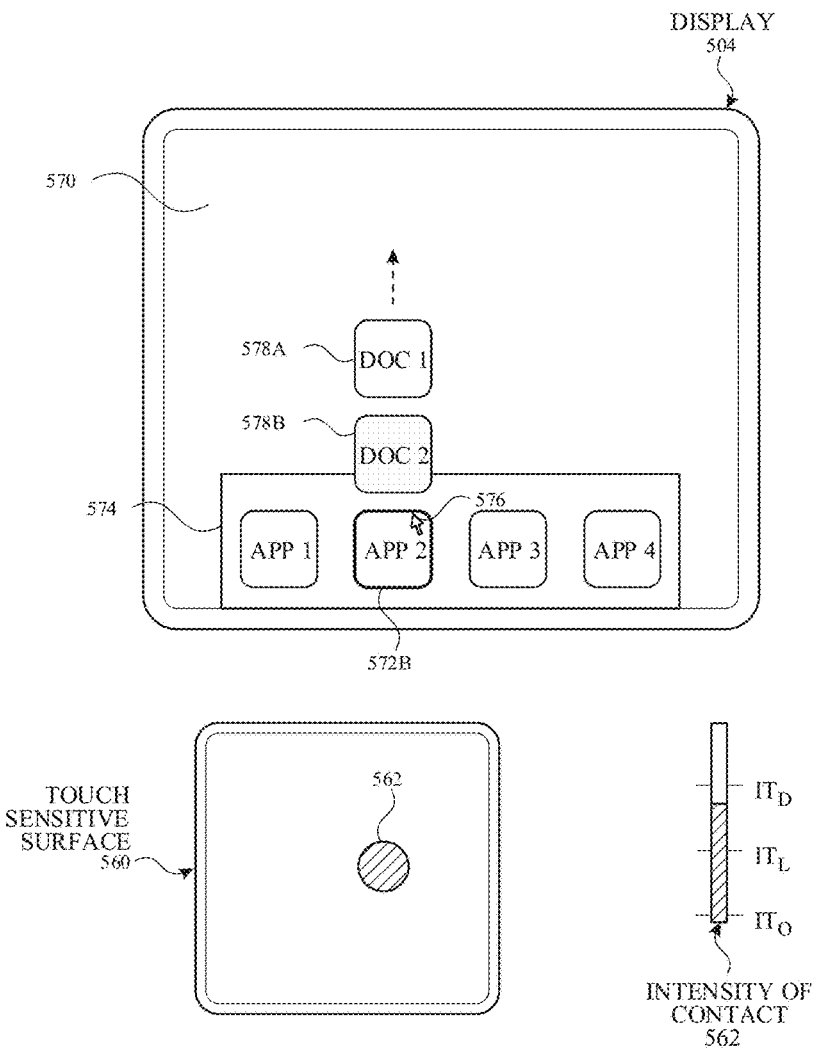
Figure 5H:
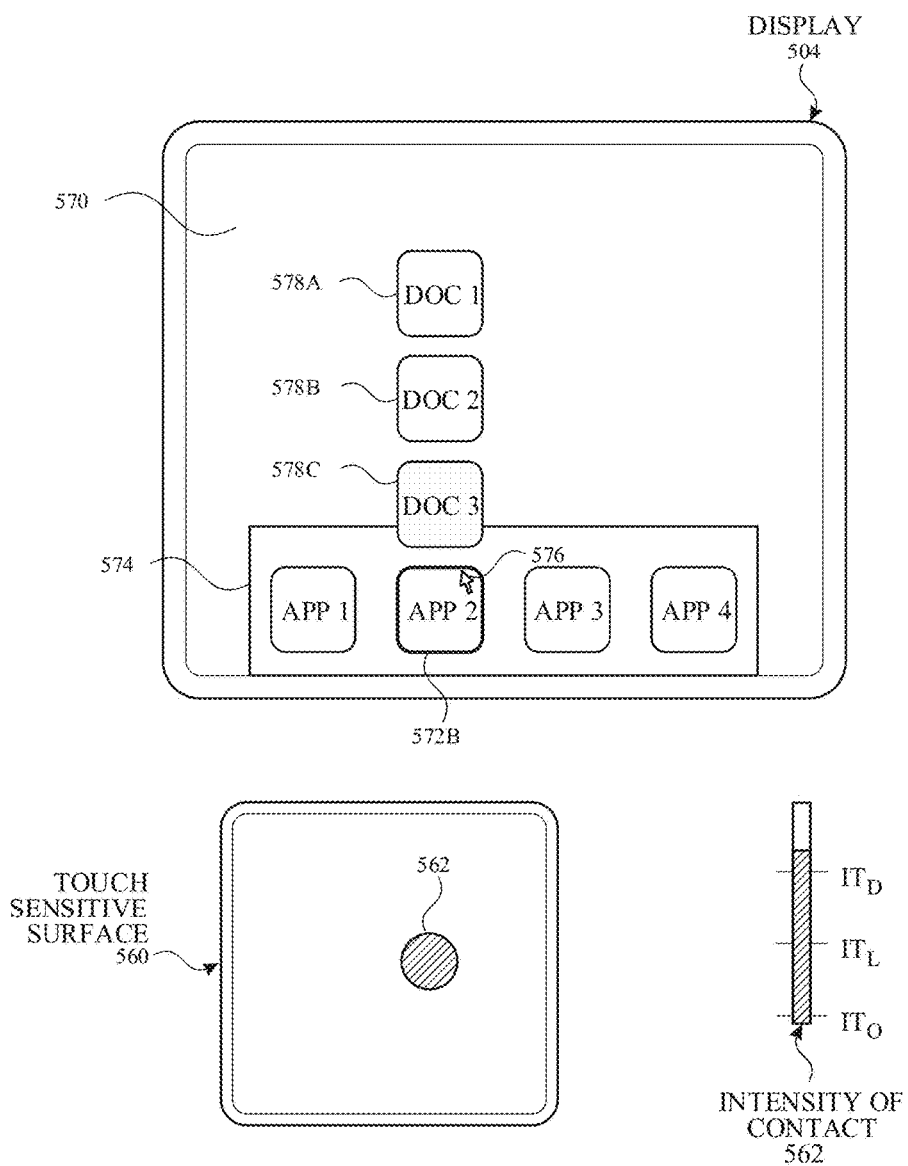

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6I illustrate examples showing an electronic device 600 having an operational safety mode in accordance with some embodiments. The examples in these figures are used to illustrate the processes described below, including the processes in FIGS. 8-10.

Figure 6A:
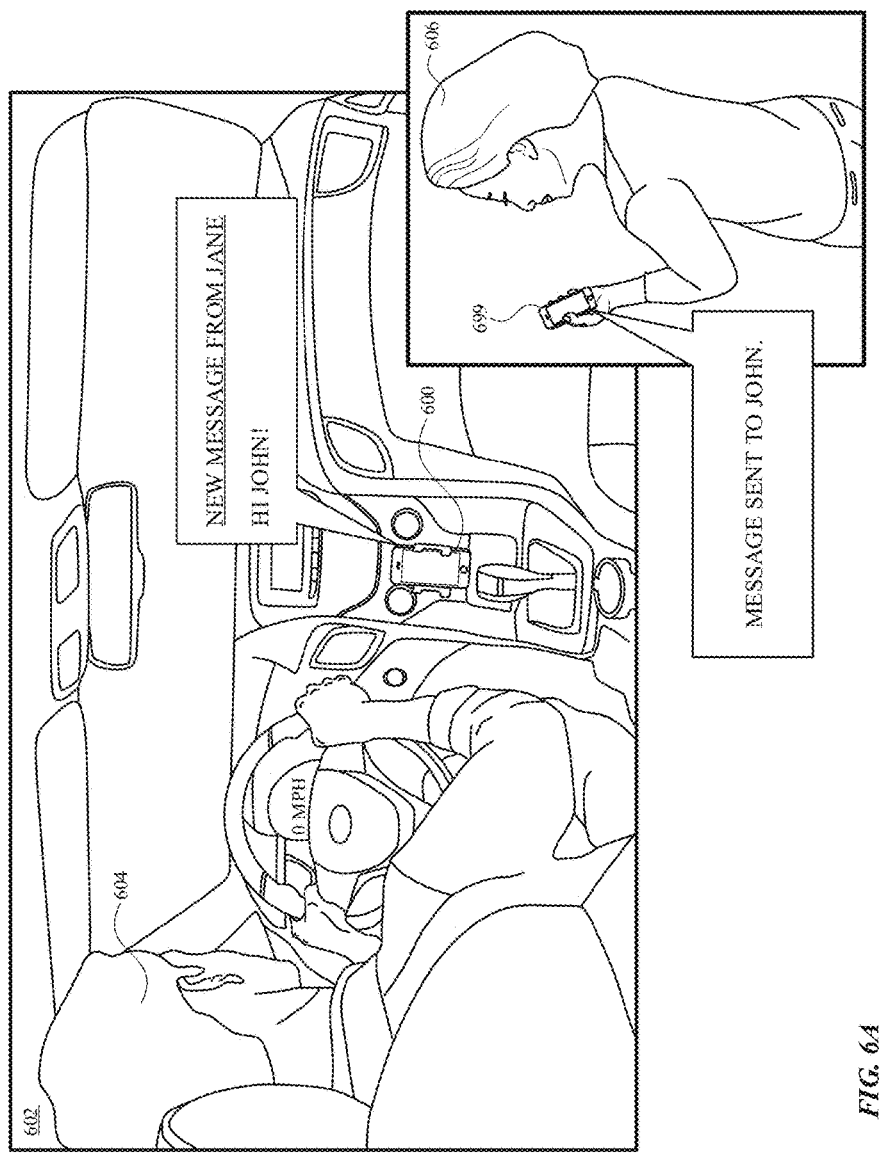

At FIG. 6A, the electronic device 600 is located within an operating motor vehicle 602 (e.g., automobile) that is being driven by a user 604 (e.g., John 604) of the device 600. While the device 600 is not operating in the operational safety mode, the device 600 operates in a normal (e.g., default or other non-operational safety mode) mode where notifications are outputted without regard to whether they satisfy notification output criteria associated with the operational safety mode. For example, while John is seated in a non-moving vehicle (e.g., as indicated by the speedometer) at FIG. 6A, an external contact 606 (e.g., Jane 606) messages John 604 (e.g., text message) from external electronic device 699 (e.g., 100, 300, 500). As shown at FIG. 6A, John's device 600 receives the incoming message and outputs a notification (e.g., "New Message from Jane: Hi John!"). In some cases, outputting notifications (e.g., visual, haptic, and/or audible) while a user is operating a motor vehicle is inconvenient and unsafe, because it distracts the user from driving.

Figure 6B:

Turning to FIG. 6B, John is driving in a vehicle travelling at 30 miles per hour (MPH) with device 600 nearby. In FIG. 6B, device 600 is now operating in an operational safety mode that manages the output of certain notifications. For instance, as discussed below, during the operational safety mode, only notifications that satisfy notification output criteria are output. As shown at FIG. 6B, Jane 606 sends a message to John 604 from external device 699 while John is driving, but John's device 600 does not display a notification when the message arrives, because the notification does not meet notification output criteria. In some embodiments, John's device 600 remains in a display off state. In some embodiments, a benefit of preventing the notification from being displayed (or output by haptic and/or audible outputs) during the operational safety mode can be that suppressing notifications prevents driver distraction. At the same time, the operational safety mode described herein permits notifications corresponding to certain (e.g., critical) messages or alerts to be outputted, thereby preventing the user from missing important information. Further, the operational safety mode provides techniques that allow the user to stay responsive to certain communications, for example by way of automatic replies. For ease of discussion, the notifications discussed herein correspond to communications from external contacts, such as text messages. However, notifications can include alerts corresponding to applications at the device (e.g., games, social media) and/or notifications based on internally generated alerts (e.g., calendar notifications, system alerts).

In some cases at FIG. 6B, the device 600 enters the operational safety mode when the device 600 detects that it is inside a moving vehicle 602 (e.g., while inside a vehicle moving at a speed (e.g., 30 MPH) above a predetermined threshold speed (e.g., 5 MPH)). For example, the device 600 detects a motion level based on GPS information (or other location sensor information), information corresponding to cell towers, and/or Wi-Fi information that exceeds a threshold motion level that indicates that the vehicle 602 is moving. In some examples, the detected motion level is a rate of change of location coordinates and the threshold motion level is a threshold rate of changing location coordinates. In some examples, the detected motion level is a rate of change of Wi-Fi networks or cell towers detected at the device 600 and the threshold motion level is a threshold rate of changing Wi-Fi networks. For example, the device 600 detects a number of Wi-Fi hotspots moving around, and/or a number of distinct Wi-Fi networks over a period of time or a number of cell towers changing over a period of time, which can indicate that the vehicle 602 is driving past numerous Wi-Fi networks. In some examples, the detected motion level and the threshold motion level corresponds to a speed or acceleration of the vehicle 602. In some examples, device 600 accounts for hysteresis to detect if, once the detected motion level falls below the threshold motion level, that the vehicle 602 is in stop-and-go traffic and should stay in or otherwise resume the operational safety mode. In some embodiments, device 600 determines if contextual parameters are indicative of the electronic device being situated within an operating motor vehicle using one or more techniques described in U.S. Provisional patent application Ser. No. 15/596,592.

In some cases at FIG. 6B, the device 600 enters the operational safety mode when the device 600 detects that it is located within an operating motor vehicle based on the output of navigation information. For example, the device 600 detects a change of location indicated by an output of turn-by-turn instructions from a navigation application at the device 600 or from the second electronic device 608.

At FIG. 6B, in some cases, device 600 enters the operational safety mode when the device 600 detects that it is located within an operating motor vehicle. For example, the device 600 detects that it is connected to a second electronic device 608 associated with the operating motor vehicle 602. In some examples, the second electronic device 608 is a device that is normally only present in or specific to motor vehicles. For example, the second device 608 is a receiver, head unit, car radio integrated at the motor vehicle, in-car technology and/or infotainment system such as CarPlay® provided by Apple, Inc. of Cupertino, Calif. In some examples, detecting or connecting to that type of device indicates to the device 600 that it is located within the motor vehicle 602. In some examples, the device 600 detects an application or standard that is specific to motor vehicles at the second electronic device 608 and/or that allows the second electronic device 608 to send and/or receive control signals with the device 600 via the wired or wireless connection. In some cases, the device 600 enters the operational safety mode when the device receives a signal from the second device 608 indicating that the motor vehicle 602 is currently in operation.

In some cases at FIG. 6B, the electronic device 600 initiates the operational safety mode and updates a third party application that the device 600 is currently in the operational safety mode. For example, the third party application is a social media platform and notifying the application that the user is currently unavailable may, in practice, enhance the user's experience by providing the information to the application, which can tailor its functions to the user's current situation (e.g., prevent the user from appearing unresponsive to other contacts at the application). In some examples, the device 600 instructs a companion device (e.g., 100, 300, 500, and/or a watch connected to the device 600) to mirror the operational safety mode.

Still, in some cases at FIG. 6B, the device 600 enters the operational safety mode based on manual activation through a user interface (e.g., a control center interface) provided at the device 600 or the connected second electronic device 608. In some cases, the manual activation and/or automatic activation that is based on detection of motion level permits the device 600 to enter the operational safety mode without requiring connection to the vehicle 602, for instance, if the vehicle does not have the second electronic device 608.

Further, in some cases at FIG. 6B, the operational safety mode is on or off (e.g., entered or not) at the device 600 based on conditions shown below at Table 1. Table 1 shows examples for prioritizing various triggers that cause initiation of the operational safety mode. As shown below, the device 600 prioritizes a second set of triggers related to connection criteria (e.g., whether the device is connected to the second electronic device 608) over a first set of triggers related to movement criteria (e.g., whether the vehicle 602 is moving at or above the threshold motion level). In some examples, whether the movement criteria (e.g., the first set of operational safety mode initiation criteria) is active or inactive (e.g., turned off) and whether the connection criteria (e.g., the second set of operational safety mode initiation criteria) is active or inactive is determined based on user selection at the device 600. In some embodiments, device 600 detects whether the vehicle 602 is moving (e.g., whether the first set of operational safety mode initiation criteria is met) using one or more techniques described in U.S. Provisional patent application Ser. No. 15/596,592.

TABLE 1

|  |  | 1st criteria active | | 1st criteria not active |
|---|---|---|---|---|
|  |  | moving | not moving |  |
| 2nd criteria active | connected | ON (1) | ON (2) | ON (3) |
|  | not connected | OFF (4) | OFF (5) | OFF (6) |
| 2nd criteria not active |  | ON (7) | OFF (8) | OFF (9) |

For example, as shown above, when the device 600 detects that it is connected to the second electronic device 608, the device enters the operational safety mode regardless of whether the device 600 detects that the vehicle 602 is moving or not and regardless of whether the movement criteria is active or not (e.g., Table 1 at (1)-(3)). For example, while the device 600 is connected to the second electronic device 608 and satisfies the connection criteria, and the device 600 determines that the vehicle 602 is not moving and does not satisfy the movement criteria, the device 600 initiates the operational safety mode anyway. However, when the device 600 detects that the vehicle 602 is moving and that the connection criteria is not active (e.g., Table 1 at (7)), the device enters the operational safety mode based on satisfying the movement criteria. In some embodiments, device 600 determines if the vehicle 602 is moving (e.g., if a level of movement satisfies the movement criteria) using one or more techniques described in U.S. Provisional patent application Ser. No. 15/596,592.

As further shown above, when the device 600 detects that it is not connected to the second electronic device 608, the device does not enter the operational safety mode regardless of whether the device 600 detects that the vehicle 602 is moving or not and regardless of whether the movement criteria is active or not (e.g., Table 1 at (4)-(6)). For example, while the device 600 is not connected to the second electronic device 608 and therefore does not satisfy the connection criteria, and the device 600 determines that the vehicle 602 is moving and satisfies the movement criteria, the device 600 does not enter the operational safety mode. In practice, prioritizing connection criteria over movement criteria can help distinguish whether the user is driving his or her vehicle or whether the user is a passenger of a moving vehicle and therefore may not need the operational safety mode, thereby reducing the instances of undesired activation of the operational safety mode. In some cases, when the device 600 detects that the vehicle 602 is not moving and that the connection criteria is not active (e.g., Table 1 at (8)), the device does not enter the operational safety mode based on not satisfying the movement criteria. In some embodiments, device 600 determines if the vehicle 602 is not moving (e.g., if a level of movement does not satisfy movement criteria) using one or more techniques described in U.S. Provisional patent application Ser. No. 15/596,592.

In some embodiments, the device 600 exits the operational safety mode of FIG. 6B based on detecting that the first and/or set of operational safety mode initiation criteria are no longer satisfied (e.g., instantly not satisfied or continuously not satisfied for a predetermined period of time), and/or based on manual user request to exit the operational safety mode. In some cases, the device 600 continues to initiate the operational safety mode intelligently based on data collected during a learning period. For example, in some cases, the operational safety mode initiation criteria are active by default until user selection inactivates one or more of the operational safety mode initiation criteria. For example, an operational safety mode learning period is active when a count for a number of instances the device 600 has entered the operational safety mode is below a threshold count. Upon exiting the operational safety mode, the device 600 displays a feedback screen (not shown) that allows the user to choose whether initiation of the operational safety mode was intentional or otherwise appreciated (e.g., receiving selection on a "yes that sounds great" or a "not right now" option). The device 600 detects the user selection rating the experience and based on the selection, stores data in a learning database and updates the count by one instance.

In some examples, the feedback screen appears at the end of the first drive or first initiation of the operational safety mode and includes informative text explaining features of the operational safety mode (e.g., the suppression of certain notifications during operational safety mode, whether the operational safety mode in that instance was triggered by connection criteria or movement criteria). In some examples, the feedback screen allows the user to change settings related to the operational safety mode (e.g., whether the detected trigger should continue to be active or inactive, selection of other triggers to be active or inactive, whitelisting certain contacts for notification output criteria during operational safety mode). In some examples, the first detected trigger of a first instance of entering the operational safety mode is set as the active trigger unless the user selects to inactivate the trigger (e.g., through settings and/or based on user feedback during the learning period). In some cases, in response to determining that the learning database indicates a pattern of repeated selections corresponding to the "not right now" option, the device automatically deactivates triggering (e.g., or a specific set of criteria for triggering) of the operational safety mode. In such cases, the operational safety mode can be reactivated for automatic initiation and/or for manual initiation via general settings or Control Center® provided by Apple, Inc. of Cupertino, Calif.

Turning now to FIGS. 6C-6I, examples for managing the output of notifications at device 600 while the device 600 is in the operational safety mode of FIG. 6B are shown. In some examples, notifications occurring during the operational safety mode are prevented from being output at the device 600 and/or at the second electronic device 608 (e.g., by instruction from device 600 to suppress output) unless the notifications satisfy notification output criteria. For example, at FIG. 6C, John's device 600 is in operational safety mode and outputs the notification corresponding to the message from Jane 606, because Jane is a whitelisted contact such as an emergency contact and/or a favorites contact that is permitted for notification output. In some examples, notifications corresponding to an application having output permission, a prioritized application (e.g., navigation providing application), and/or a user-selected prioritized application or contact is permitted for notification output during the operational safety mode.

Figure 6C:
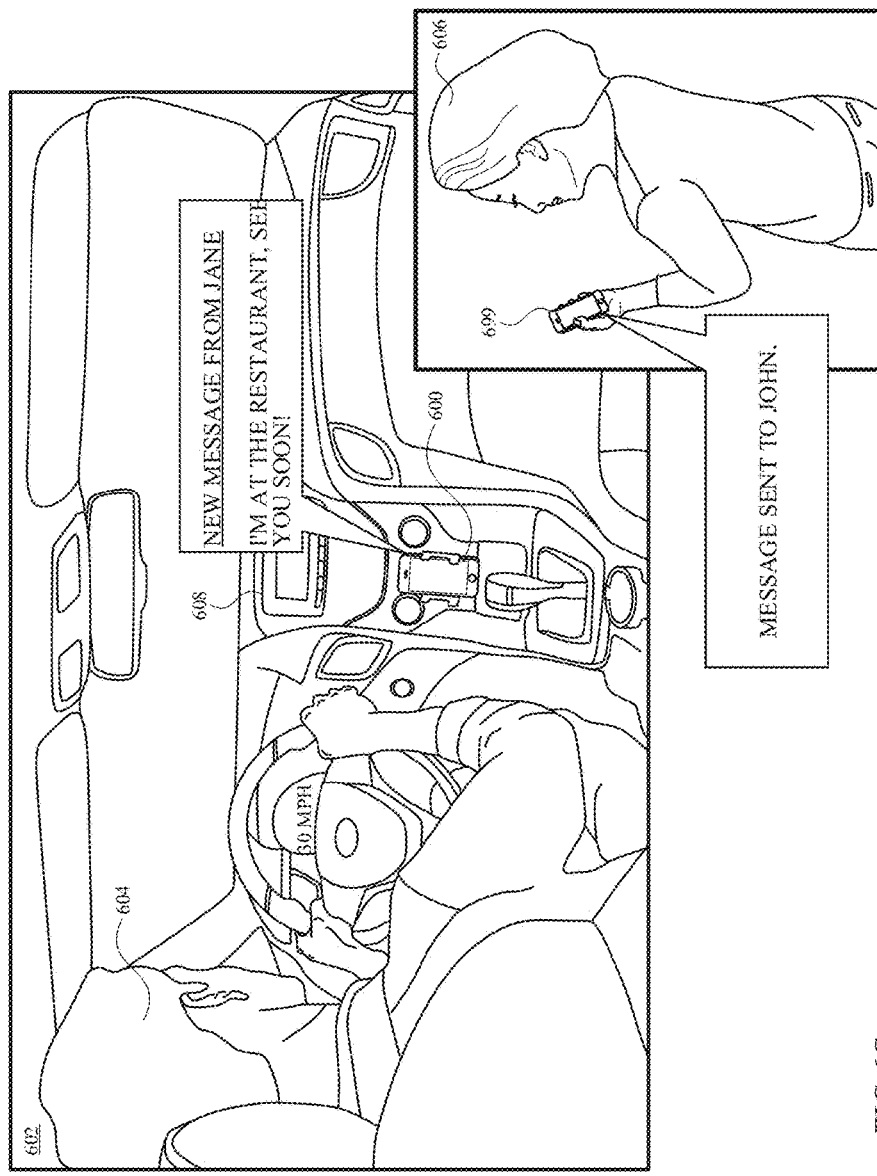

In some embodiments relating to FIG. 6C, the notification corresponding to Jane's message is output at John's device 600 during the operational safety mode, because Jane is a contact having location-sharing access. For example, Jane's device 699 is permitted to acquire location information of John's device 600 based on a location-sharing active status or application acknowledged by John and/or John's device 600.

In some embodiments relating to FIG. 6C, the notification corresponding to Jane's message is output at John's device 600 during the operational safety mode, because Jane 606 is a recent contact at John's device 600. In some examples, Jane 606 is classified as a recent contact based on a recent communication with Jane 606 (e.g., by phone or text message) that occurred within a past predetermined window of time (e.g., within the past 24 hours) since arrival of the message and/or since initiation of the operational safety mode. In some examples, Jane's recency is based on whether John actively participated in the phone call (e.g., answered an incoming call, initiated an outgoing call) or sent an outgoing text message to the contact within the past predetermined window of time. In some embodiments, permitting notifications from recent contacts can reduce the instances of missing time-critical messages (e.g., cancellation of an appointment at the user's driving destination).

Further, in some examples, notifications are output during operational safety mode if they correspond to repeated communications from a single contact within a window of time (e.g., communications that exceed a threshold number of communication attempts within a predetermined time period). For example, John's device 600 outputs notifications for an incoming call or text message that is a repeated call or text message from a single contact. In some examples, notifications are output during operational safety mode if they correspond to an incoming phone call and the device 600 is Bluetooth integrated with the second electronic device 608 that allows answering the call from a button provided at the steering wheel of the motor vehicle 602. Still, in some examples, notifications are output during operational safety mode if they correspond to a system alert indicating a status of the device 600 (e.g., battery level alert) or an emergency alert (e.g., emergency weather alert, government issued alert, AMBER alert).

Figure 6D:
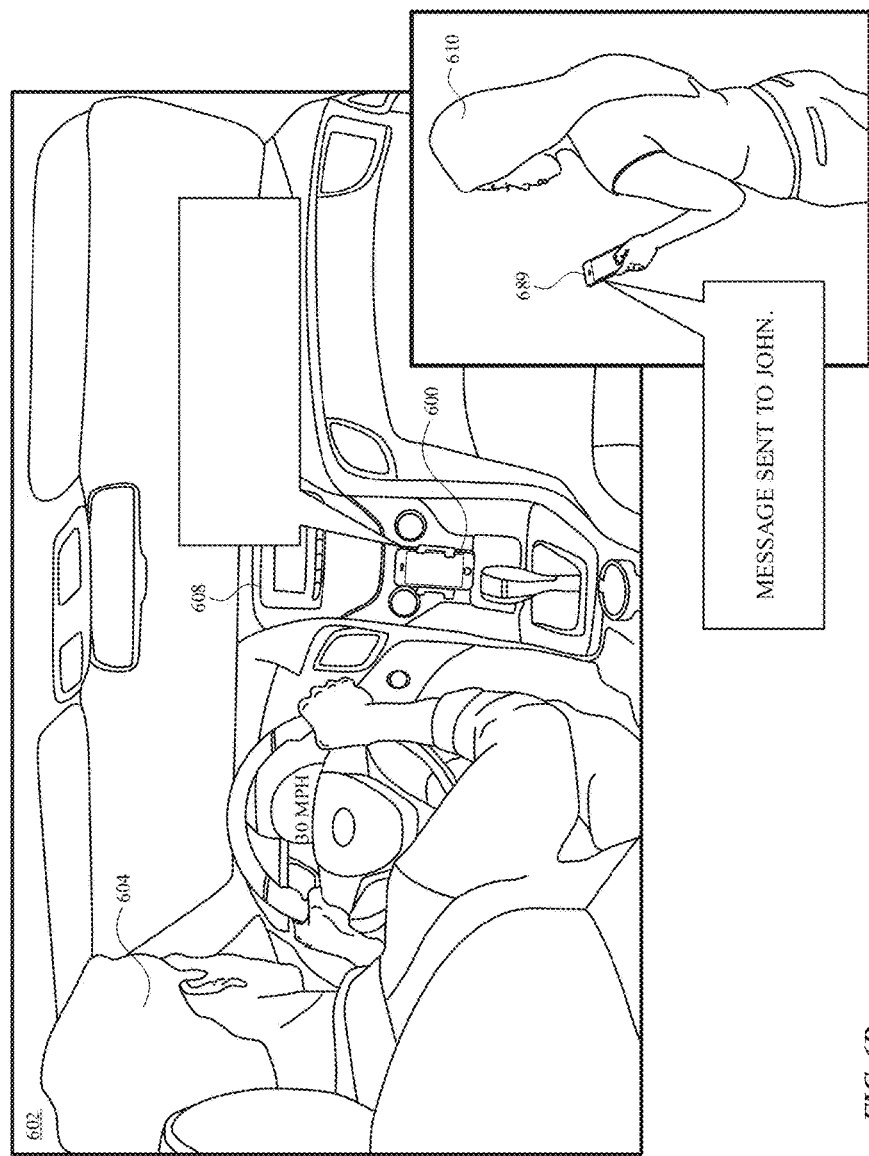

Referring now to FIGS. 6C-6D, at FIG. 6C, in some examples the notification corresponding to Jane's message is output at John's device 600 during the operational safety mode, because Jane 606 is a contact that is included in a calendar reminder that is scheduled for at or around the same time as the arrival of the message. For example, John's device 600 includes a calendar event for lunch at 12:30 pm, with Jane listed as an invitee. Jane's message is received at 12:15 pm and is considered to be within an allowed timeframe of the calendar event and therefore is output. In practice, the device 600 allows critical contacts (e.g., based on calendar invitation information and/or recency) to reach the user 604 so that the user does not miss critical information, for example regarding whether a meeting that the user is driving to is canceled or changed. In some examples, the device 600 determines that the notification for Jane's message should be output based on GPS information that matches John's direction of travel with a designated location of the meeting of the calendar invitation. In a further example as shown at FIG. 6D, external contact 610 (e.g., Emily 610) is not an invitee in the calendar invitation and therefore a notification corresponding to her message sent from external device 689 at or around the same time as Jane's message (e.g., 12:15 pm) is not output at John's device 600. In some cases, notifications that do not satisfy the notification output criteria are stored for later retrieval (e.g., retrieval through a notifications center when the device has exited the operational safety mode and/or otherwise is in an unlocked state, and/or caused for display on a screen such as a locked screen upon exiting the operational safety mode as shown below at locked screen 708 of FIG. 7A).

Turning now to FIGS. 6E-6H, in some examples, notifications are output during operational safety mode when the notification corresponds to a communication that includes a notification output request. In some examples, the notification output request is a request that is selected by an external user at an external device that requests that the device 600 output a notification when the communication from the external device is received. In some examples, the contact requires permission or whitelisting status from device 600 to attach the notification output request or to make the request effective. In some examples, contacts that are permitted to receive an automatic reply from the device 600 are permitted to select the notification output request.

Figure 6E:
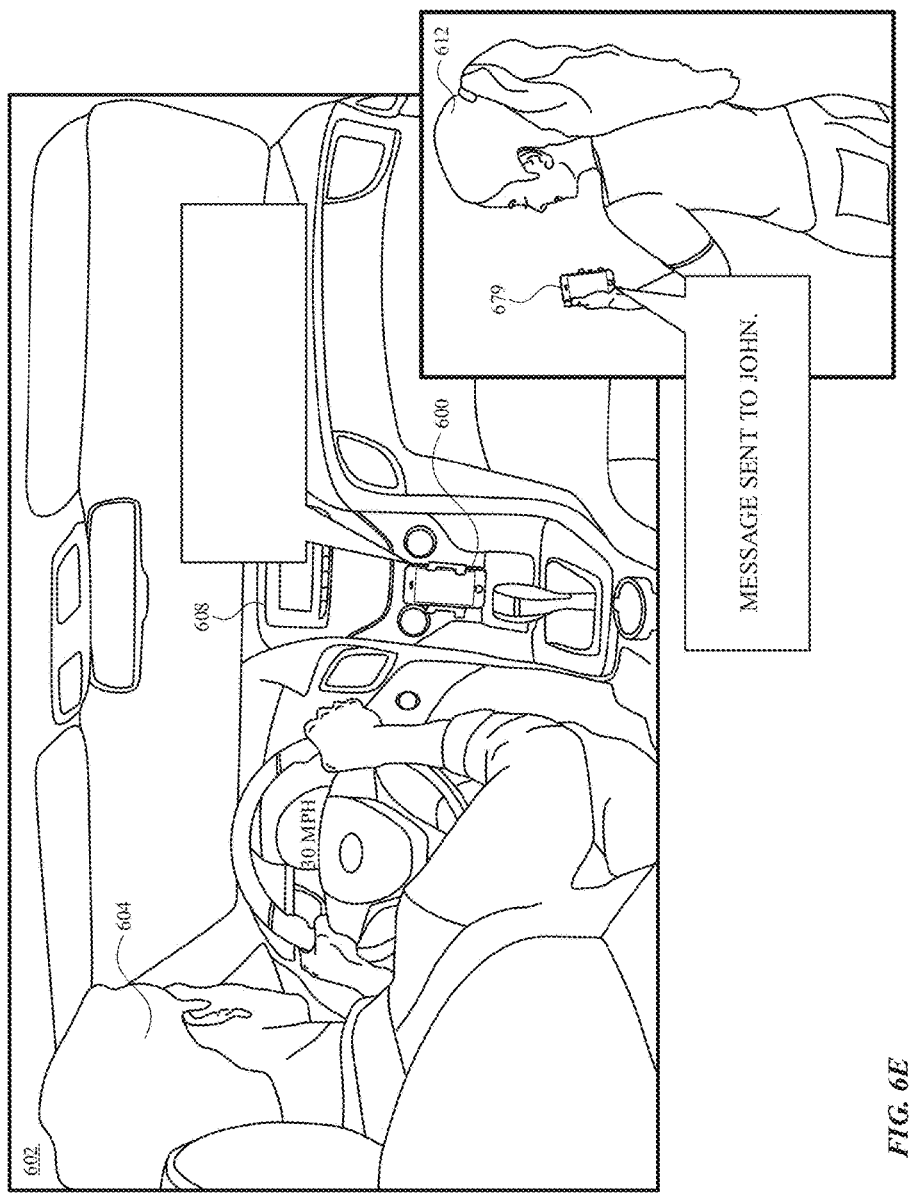
Figure 6F:
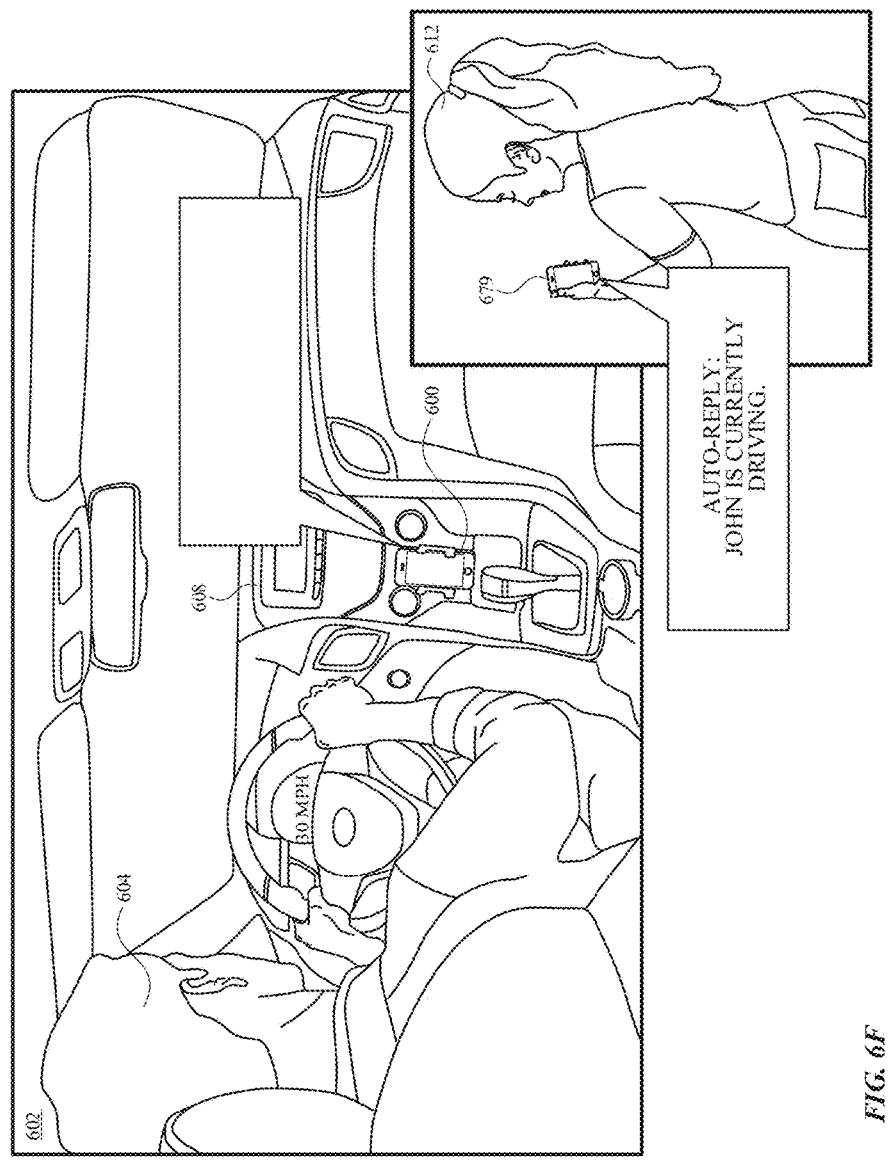

For example as shown at FIG. 6E, an external contact 612 (e.g., Shannon 612) messages John 604 from external device 679. John's device 600 is in operational safety mode and does not display a notification corresponding to Shannon's message, because the notification does not meet notification output criteria. However, Shannon is provided with an automatic reply in response to her communication being received during the operational safety mode. As shown at FIG. 6F, John's device 600 responds to Shannon's message automatically by sending an automatic reply to Shannon's device 679. In some examples, the automatic reply includes text indicating that the user 604 is currently operating the motor vehicle 602 and/or that notifications are currently being suppressed or stored for later retrieval. In some examples, the automatic reply includes a location waypoint of device 600. Further, in some examples, the automatic reply is a user-customized message for specific classes of contacts, for all contacts that permitted to receive automatic replies, or individualized for a particular contact. In some cases, a single automatic reply is provided for any contact that is permitted to receive the automatic reply. In some examples, the automatic reply includes instructions for circumventing the suppression of notifications by providing an explicit notification output request.

Figure 6G:

Turning to FIG. 6G, subsequent to receiving the automatic reply, external contact Shannon 612 decides that her message is important and should be output at John's device 600. In this case, Shannon 612 selects a notification output request to correspond to the previously sent communication or to a new communication. A benefit of allowing selection of the notification output request for the previously sent communication is that the contact does not have to retype the message in order to have it requested for output at John's device 600. As shown at FIG. 6G, when the message is sent with the selected notification output request (e.g., selected at a text messaging application used to send the communication at Shannon's device 679), John's device 600 displays a notification corresponding to Shannon's message (e.g., "Hi John! I have another meeting and can't make it."). In some examples, John's device 600 indicates whether the notification that is output is being output because it included the notification output request.

In some examples, subsequent to receiving the automatic reply, Shannon 612 decides that the message that was sent or a new message being sent is not important for output at this time, and therefore does not select to attach the notification output request at her device 679. In that case, the message sent from Shannon's device 679 is not output for notification during the operational safety mode at John's device 600, as demonstrated in the depiction at FIG. 6E. In this way, the notification output request is associated only with a single message that is being sent from the contact.

Figure 6H:
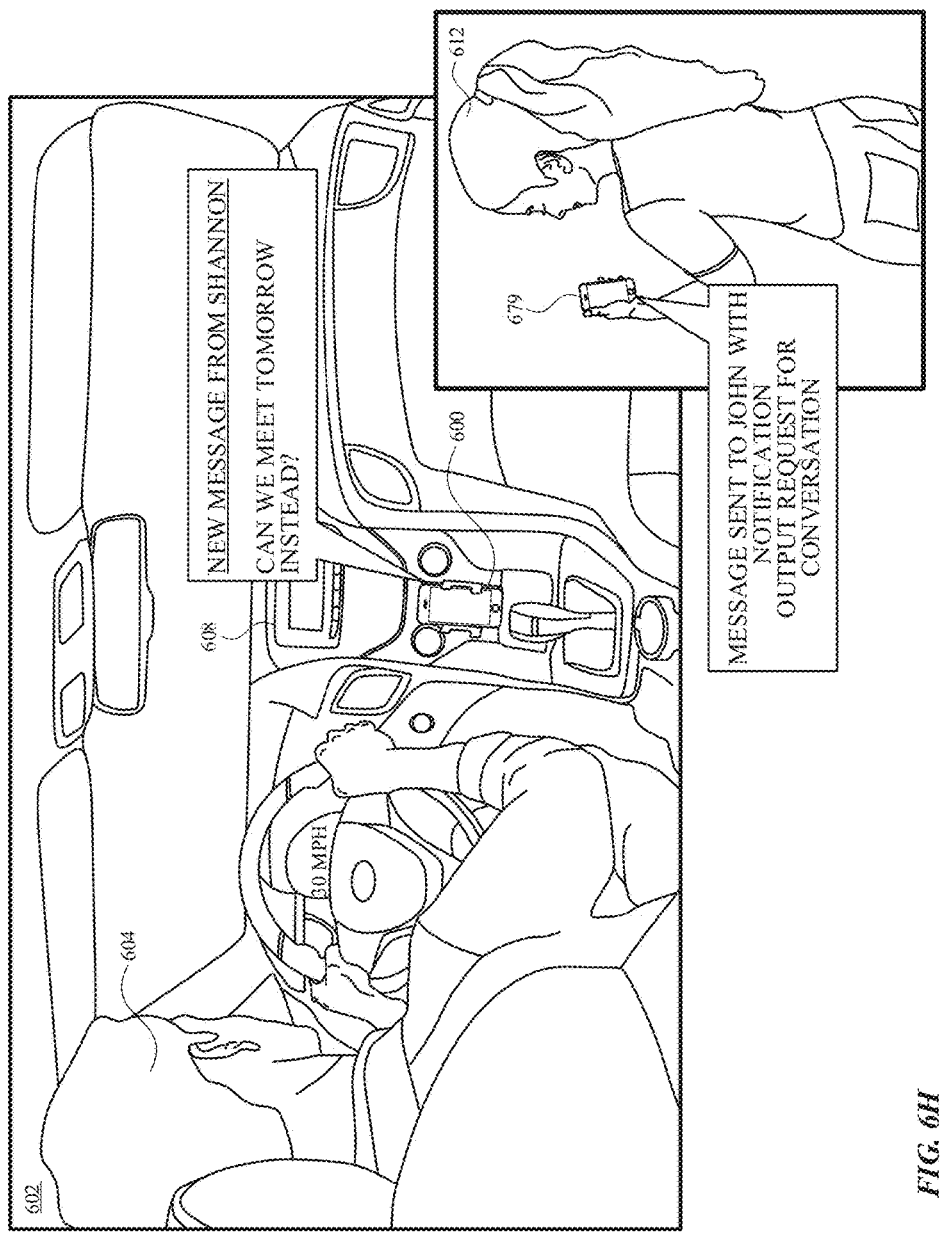
Figure 61:
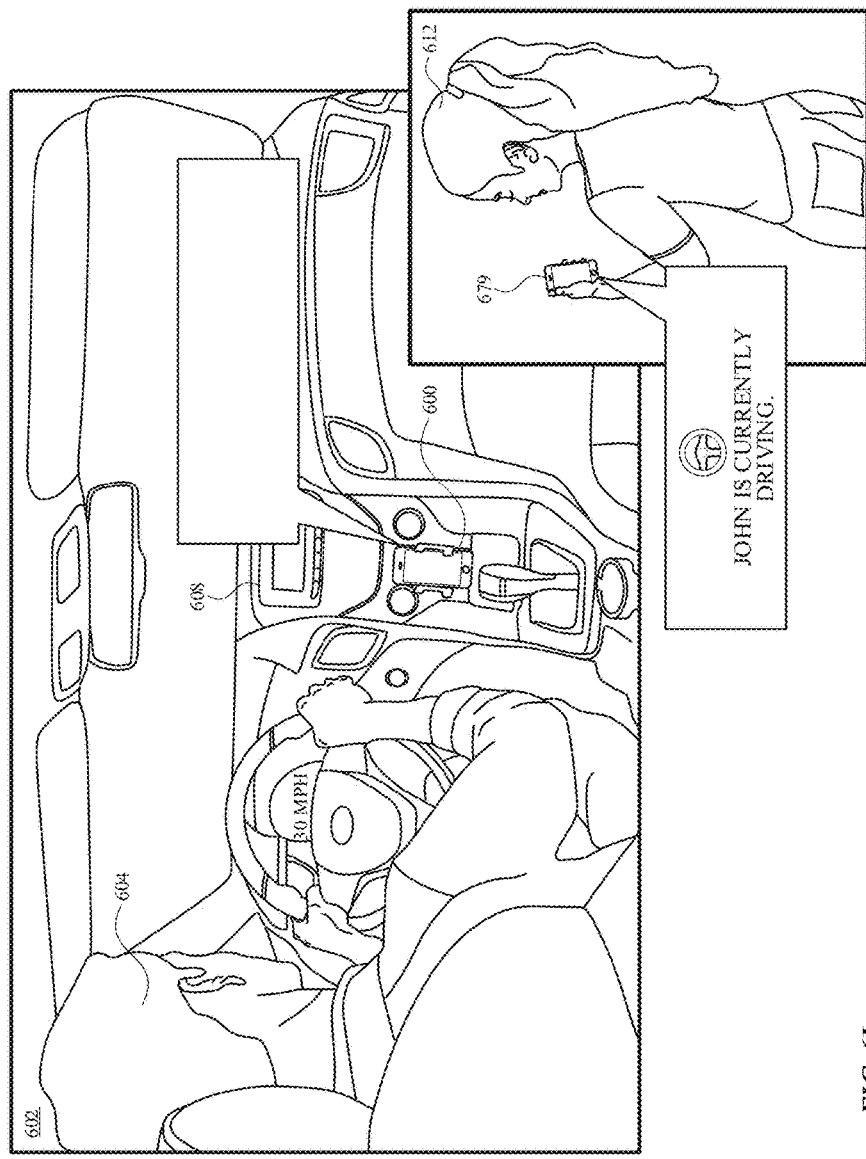

Turning to FIG. 6H, in another example, the notification output request is implemented for a conversation thread between devices 600, 679 of John 604 and Shannon 612, respectively. For example, at FIG. 6H, Shannon 612 sends a message to John 604 during the operational safety mode after Shannon's device 679 received the automatic reply, and further after Shannon 612 selected the previous notification output request at FIG. 6G. In this case, John's device 600 outputs a new notification corresponding to the new message (e.g., "Can we meet tomorrow instead?") because the notification output request is applied to a remainder of the conversation with Shannon 612. In this case, Shannon 612 does not need to explicitly request the notification output request each time she sends a message to John while John is in the operational safety mode. In some examples, Shannon's conversation is no longer marked with the notification output request after inactivity in the message thread for a period of time, and/or after the device 600 exits the operational safety mode. In such cases, Shannon 612 would need to reselect the notification output request, in some cases subsequent to receiving another automatic reply, when the device re-enters the same or a new operational safety mode session.

In some examples, the notification output request causes John's device 600 to output a notification only when the request is from an external contact that is authorized by device 600 to make the notification output request, and/or is authorized to receive automatic replies from device 600. In some examples, a contact is authorized to select notification output requests from their device when the contact is authorized to receive automatic replies, as demonstrated above in foregoing FIGS. 6E-6H, when the contact is a recent contact, when the contact has location-sharing on with the recipient, and/or when the contact is a calendar invitee corresponding to a calendar event taking place at a similar or same time. In some examples, contacts are permitted to receive automatic replies based on one or more of the same foregoing criteria.

Turning now to FIG. 6I, in some examples, during the operational safety mode, John's device 600 sends an operational safety mode indication to Shannon's device 679 when device 600 detects that Shannon 612 is typing the message to John 604. For example, device 600 provides a presence-indicator to Shannon's device 612 in response to receiving an indication of a potential incoming communication from Shannon's device 612. As shown at FIG. 6I, Shannon's device 612 outputs the presence indicator (e.g., a steering wheel glyph and/or "John is currently driving") to inform Shannon 612 that John 604 is currently driving and therefore allow Shannon 612 to decide whether to continue to type and send the message now or later. In some examples, device 600 provides the presence indicator to all contacts, or to contacts satisfying certain criteria as noted above, such as contacts that are permitted to receive an automatic reply and/or have location-sharing access. In some examples, the presence-indicator is provided when both contacts utilize a common messaging platform at their respective devices 600, 679, such as iMessage (e.g., short messages via services such as SMS and MMS, text messages via services such as iMessage® provided by Apple, Inc. of Cupertino, Calif.).

FIGS. 7A-7D illustrate exemplary user interfaces for an operational safety mode, in accordance with some embodiments. The user interfaces in these figures are used to illustrate the processes described below, including the processes in FIGS. 8-10. In FIGS. 7A-7D, the user interfaces ("UI") and associated processes are implemented on an electronic device 700, such as portable multifunction device 100, device 300, or device 500.

Figure 7A:
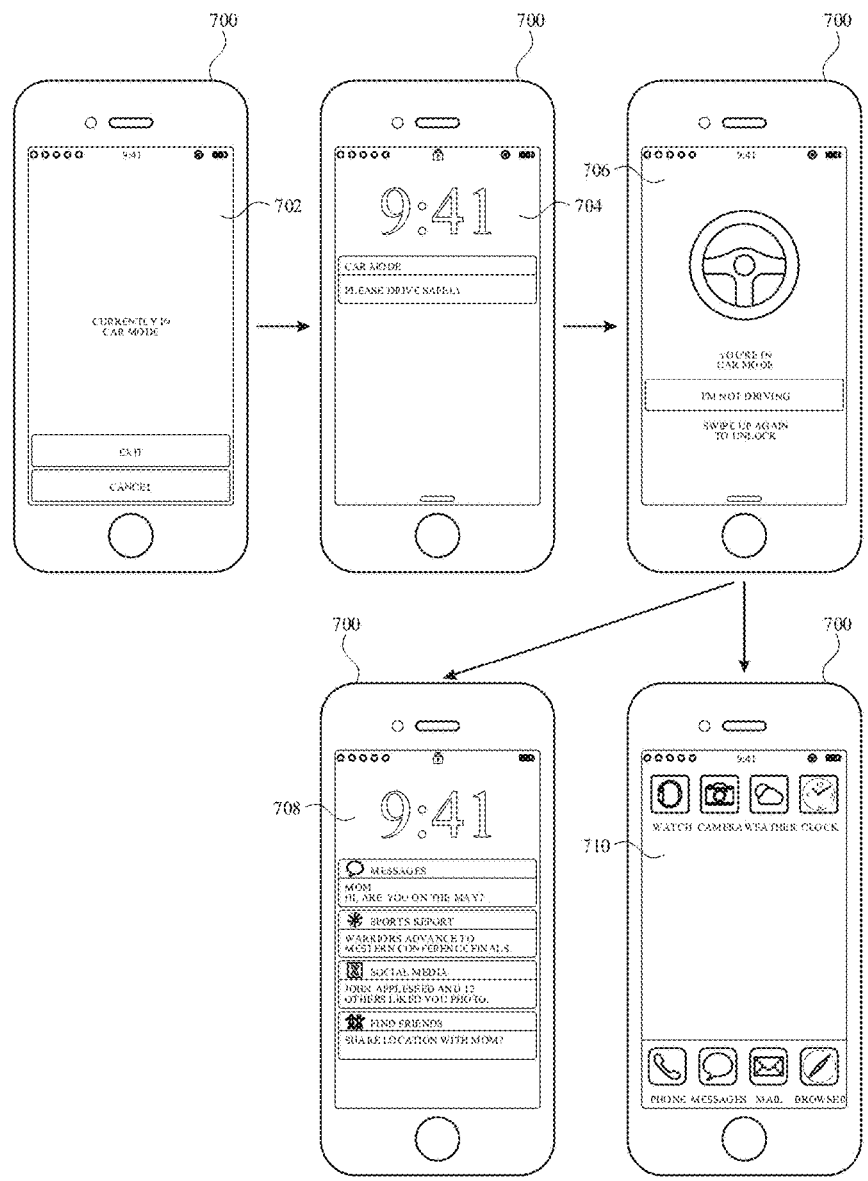
FIGS. 7A-7D illustrate example user interfaces during the operational safety mode in accordance with some embodiments.

FIG. 7A shows example user interfaces displayed at device 700 during an operational safety mode, for example when the device determines that the user is operating a motor vehicle. The device 700 displays a locked screen having an operational safety mode notification indication (at locked screen 702) and/or banner (at locked screen 704) indicating that the device 700 has started a locked session associated with the operational safety mode. As shown at locked screens 702, 704, and 706, text indications can include, merely by way of example, "Do-Not-Disturb is on while driving. Notifications on locked screen are filtered," "Currently in Car Mode," "You're in Car Mode." In some examples, the operational safety mode indication banner at locked screen 704 is a sticky banner that remains at a top of a list of scrollable notifications (e.g., notifications that satisfy notification output criteria) populated below it.

In some examples, in response to a touch input (e.g., force touch input having a characteristic intensity that that exceeds a first intensity threshold or a touch sustained for greater than a predetermined amount of time) on the operational safety mode notification banner of locked screen 704, the device 700 unlocks. In some examples, in response to the touch input, the device 700 ends the current locked session and exits the operational safety mode. Still, in some examples, in response to the touch input, the device 700 ends the current locked session and pauses operational safety mode. In some examples, the touch input provides a quick unlocking gesture. In some examples, the device 700 is unlocked and stays in the operational safety mode subsequent to receiving user confirmation that the user is currently not operating the vehicle (e.g., pulled over).

In some examples, in response to the touch input on the operational safety mode notification banner, the device displays a first affordance (not shown) that when selected causes the device to end the locked session and exit the operational safety mode, and a second affordance (not shown) that when selected causes the device to end the locked session and pause the operational safety mode. For example, the first affordance corresponds to an "I'm not driving" option to exit the operational safety mode, and the second affordance corresponds to an "I'm pulled over" option to pause the operational safety mode. In some examples, a swipe input on the operational safety mode banner reveals the first and second affordances on locked screen 704. In some cases, a paused operational safety mode and/or locked state automatically resumes when driving is detected, for example when contextual parameters satisfy criteria to initiate operational safety mode, as discussed herein.

As further shown at FIG. 7A, in some examples, in response to detecting a user input to unlock the device 700, the device 700 displays a confirmation affordance without unlocking the device, and in response to user confirmation, unlocks the device. In some examples, unlocking the device ends the locked session. For instance, a user input corresponding to an upward swipe on locked screen 704 causes display of a confirmation action sheet as shown at locked screen 706 that asks the user to confirm "I'm not driving" to exit operational safety mode. In some examples, the device 700 temporarily unlocks while remaining in operational safety mode. Still, in some examples, the device 700 permits one unlocking session per predetermined period of time or operational safety mode period. In some examples, the device 700 displays an alternative "I've pulled over" affordance (not shown) to allow user to access certain features, such as maps and navigation applications, and automatically resumes the operational safety mode when driving is detected.

In some examples, in response to receiving user confirmation to unlock the device 700, the device displays locked screen 708 which shows unread notifications, including notifications that were received and not output during the operational safety mode (e.g., notifications that did not satisfy notification output criteria). For example, locked screen 704 during the operational safety mode does not show the various notifications shown at locked screen 708, which corresponds to a normal locked screen when operational safety mode is not currently implemented.

Still referring to FIG. 7A, in some examples, in response to receiving user confirmation to unlock the device 700, the device displays home screen 710 including a plurality of application launch icons that, when selected, launch their underlying applications. In some examples, the device 700 detects user request for a notifications center and displays the notifications center (not shown), which includes a first list preceding a second list, where the first list includes a first notification corresponding to a notification that did not satisfy the output criteria and was not output during operational safety mode, and the second list includes one or more notifications (e.g., unread notifications) received prior to the locked session (prior to entering the operational safety mode). For example, the device 700 provides a notification center that bifurcates between notifications received before and during the last locked session, and/or during an entire operational safety mode session. In some examples, the first list includes notifications suppressed from display.

Further, in some examples, while the device 700 is unlocked, the device 700 determines that the set of operational safety mode initiation criteria is satisfied and enters the operational safety mode by relocking the device into a second locked session. In some examples, relocking associates the first notification (not shown) at the first list with the second list. In some examples, during the second locked session, the device 700 receives a second notification (not shown) that does not satisfy the notification output criteria and stores the second notification in the notification center. In some examples, storing includes associating the second notification with the first list. In some examples, the device 700 detects a subsequent user request to unlock and ends the second locked session. While unlocked, the device 700 detects a subsequent user request (e.g., pull-down gesture or downward swipe on an upper portion of the home screen 710) to display the notifications center and displays the first list and the second list, where the first list includes the second notification and the second list includes the first notification. For example, the notification center shows notifications received during the last locked session. Relocking the device 700 starts over the listing of notifications in the first list, for example by moving items in the first list (e.g., if still unread) to the second list.

Further in reference to FIG. 7A, while the device 700 is unlocked, the device 700 detects a user request to lock the device (e.g., manual activation) or contextual parameters to initiate operational safety mode and resumes the operational safety mode. In some examples, in response to the user request and/or detection of contextual parameters that satisfy operational safety mode initiation criteria, the device 700 displays the locked screen 704 with the operational safety mode notification banner. In some examples, resuming to operational safety mode (e.g., by manual activation through a control center) while still in the unlocked home screen 710 causes display of the operational safety mode banner (e.g., banner as shown at FIG. 7A, locked screen 704) on the home screen 710. In some embodiments, device 700 determines if contextual parameters are indicative of the electronic device being situated within an operating motor vehicle using one or more techniques described in U.S. Provisional patent application Ser. No. 15/596,592.

Figure 7B:
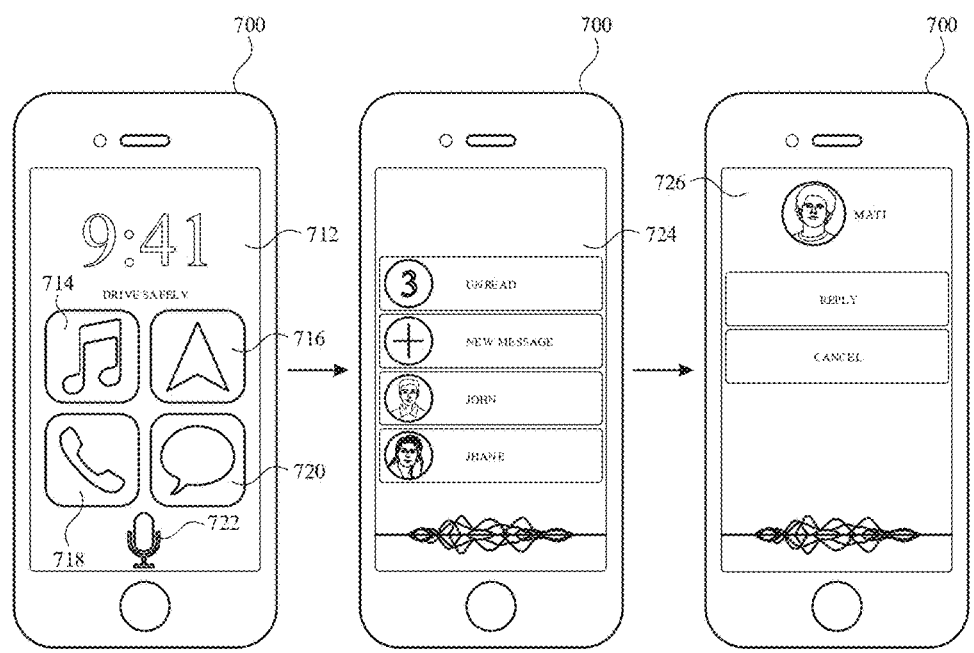
Figure 7C:
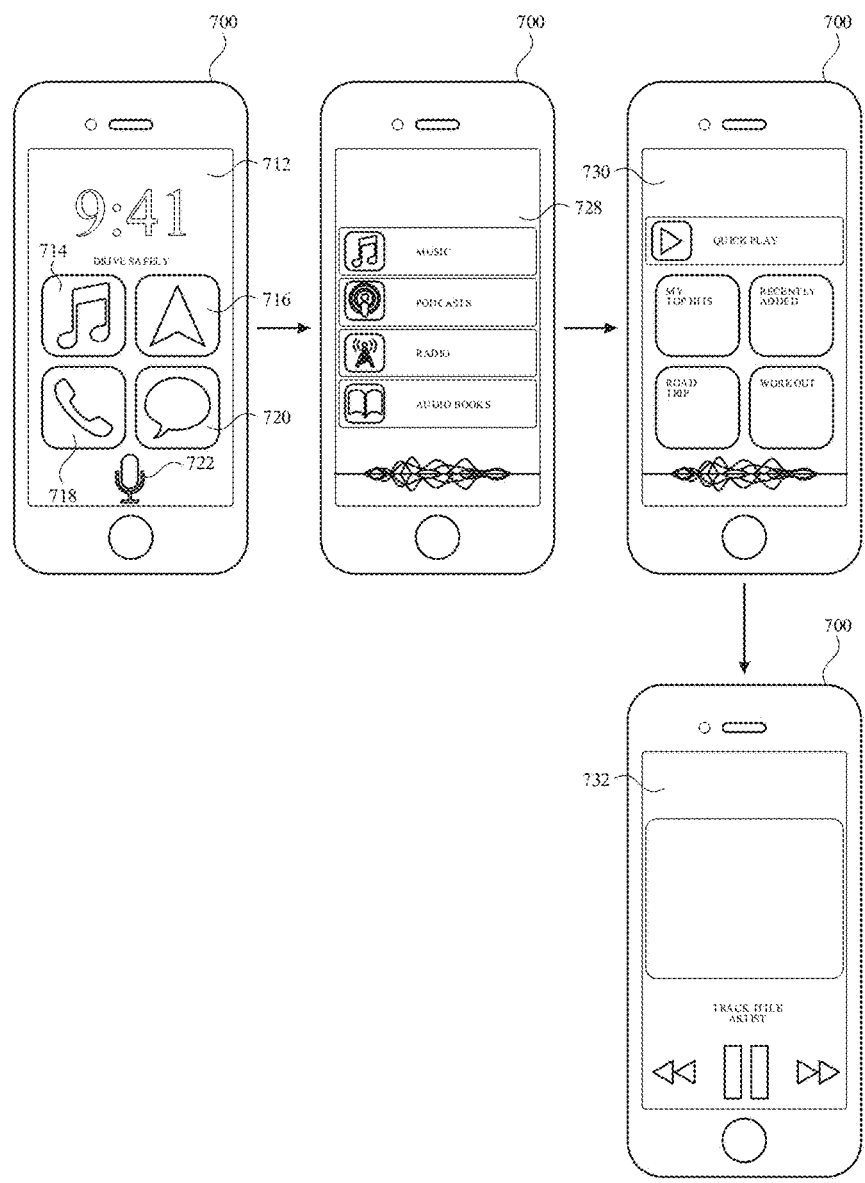
Figure 7D:
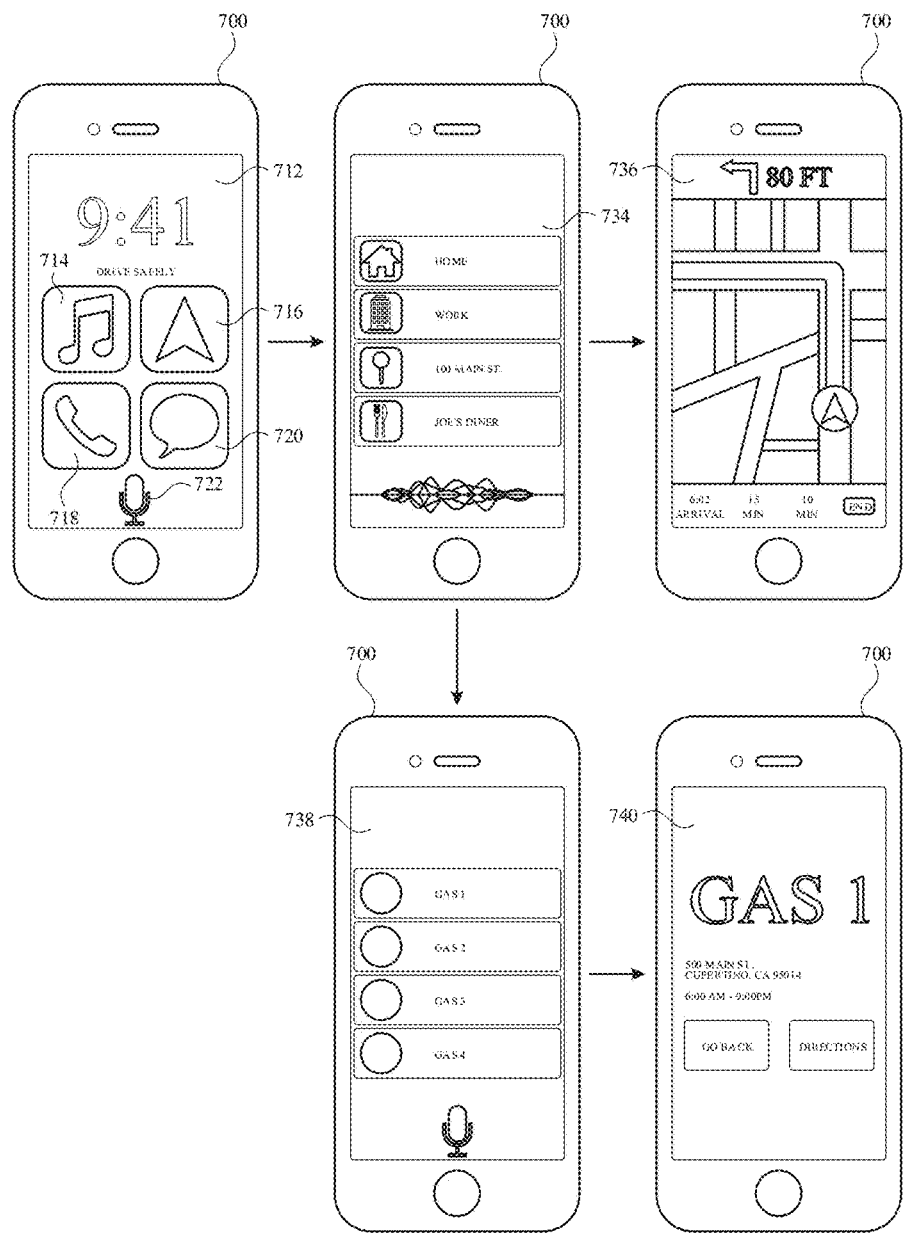

Turning to FIGS. 7B-7D, in some examples during the operational safety mode, the device 700 displays a locked user interface 712 including one or more affordances 714, 716, 718, 720, 722 corresponding to one or more enabled tasks (e.g., music, navigation, phone, messaging, and voice control). In response to detecting user selection of an affordance corresponding to an enabled task, the device 700 displays a user interface corresponding to the enabled task. In some examples, a user selection for an enabled task is a voice command detected at a microphone. In some examples, the user selection for the enabled task is a touch input on the affordance. As shown at locked user interface 712, the affordances 714, 716, 718, and 720 have larger tap target areas than corresponding affordances on home screen 710 at FIG. 7A to promote easy navigation. In some examples, the user interface 712 specifically omits some of the application launch icons from the home screen 710 of FIG. 7A that are deemed not useful during driving or not safe for use during driving. In practice, limiting the options in the operational safety mode allows quicker and easier selection of relevant features, thereby reducing interaction time with the device 700 and reducing the risk of driver distraction.

As shown at FIG. 7B, detecting selection of the messaging affordance 720 transitions the locked user interface 712 to an inbox user interface 724 that includes notifications received during operational safety mode that satisfy the notification output criteria. In the current example, there are three unread notifications which in some examples are further indicated as a notification badge (not shown) that indicates the number of notifications received that satisfy the output criteria. In some examples, the inbox user interface 724 provides a unified inbox of messages from different types of applications corresponding to notifications from authorized contacts, regardless of the application that the notifications are related to, to promote a people-centric inbox. In some examples, inbox user interface 724 permits replying to contacts as shown at reply screen 726. In some examples, one or more functions provided by the user interfaces 724 and 726 are accessible by voice control. In some examples, tap target areas for the affordances corresponding to enabled tasks at the various user interfaces 724, 726 are enlarged, as shown at FIG. 7B, to promote easy selection and reduce the risk of driver distraction.

As shown at FIG. 7C, detecting selection of the music affordance 714 causes display of a music user interface 728 with various options (e.g., music, podcasts, radio, audiobooks). In some examples, selection of the music option causes display of a second music interface 730 that includes a quick-play affordance to control output of music and enter a music control interface 732. In some examples, one or more functions provided by music user interfaces 728, 730, 732 are accessible by voice control. In some examples, tap target areas for the affordances corresponding to enabled tasks at the various user interfaces 728, 730, 732 are enlarged, as shown at FIG. 7C, to promote easy selection and reduce the risk of driver distraction.

As shown at FIG. 7D, detecting selection of the navigation affordance 716 causes display of a navigation user interface 734 that includes one or more quick-start navigation affordances to request turn-by-turn instructions for one or more predetermined destinations (e.g., recents, frequent places, location suggestions, favorites, home). Selection of a quick-start navigation affordance provides direction information, for example as shown at navigation screens 736, 738, and 740. In some examples, one or more functions provided by navigation user interfaces 734, 736, 738, and 740 are accessible by voice control. In some examples, tap target areas for the affordances corresponding to enabled tasks at the various user interfaces 734, 736, 738, and 740 are enlarged, as shown at FIG. 7D, to promote easy selection and reduce the risk of driver distraction.

As shown at locked user interface 712 at any of FIGS. 7B-7D, detecting selection of the voice control affordance by voice input or touch input initiates a voice control task that registers voice input detected at the microphone for navigating one or more user interfaces during the operational safety mode. In some examples, the voice control task locks out capabilities that require the device 700 to be unlocked during operational safety mode. For example, the voice control denies voice commands that require full access to the home screen 710 at FIG. 7A, and responds with an audible output (e.g., "Sorry, I can't help you with that while you're driving.")

In some examples, the voice control task enters a verbose operational mode during the operational safety mode that is distinct from a normal operational mode when the device is not in operational safety mode. During verbose operational mode, the voice control task provides more guidance and details for navigating and accomplishing tasks at various user interfaces such that the user looks at the display screen less often. For example, verbose operational mode confirms when messages are sent and provides additional reminders when normal operational mode does not.

In some examples, in response to detecting user selection of the voice control task, the device 700 enables a voice control having a context specific for the user interface corresponding to the enabled task. For example, the voice control is associated with the user interface that is currently being displayed. In some examples, while displaying the user interface corresponding to the enabled task, the user interface is a first user interface and the voice control includes a first context specific for the first user interface. In response to detecting user input to display a second user interface, where the second user interface is different than the first user interface, the device 700 transitions display from the first user interface to the second user interface and updates the voice control with a second context specific for the second user interface. The second context is different than the first context. In some examples, the first and second contexts are associated with the enabled task (e.g., switching between music-related user interfaces 728, 730, 732) or unrelated (e.g., switching from any of the music-related user interfaces 728, 730, 732 to any of the navigation user interfaces 734, 736, 738, 740). In some examples, swiping on a user interface changes the contexts for voice control as the user interfaces are changed. In some examples, what is displayed on the screen defines the context for voice commands. In some examples, the context of the voice control includes reversible steps in a flow of voice commands, including reversible steps between different user interfaces of related enabled tasks or unrelated enabled tasks.

In some examples, while the voice control is enabled, the device 700 determines an audio range for voice detection at the microphone and automatically modifies an acoustic model to adapt the voice detection to the determined audio range. Merely by way of example, the device 700 listens for voice commands while the device 700 is placed in a cup holder inside the operating motor vehicle.

FIG. 8 is a flow diagram illustrating a method for an operational safety mode using an electronic device in accordance with some embodiments. Method 800 is performed at a device (e.g., 100, 300, 500) with a display. Some operations in method 800 are, optionally, combined, the order of some operations are, optionally, changed, and some operations are, optionally, omitted.

As described below, method 800 provides an intuitive way for implementing an operational safety mode that can include filtering the output of notifications when certain contextual parameters are detected (e.g., contextual parameters that indicate a user of the device is driving). The method reduces the cognitive burden on a user for managing the output of notifications, thereby creating a more efficient human-machine interface. For battery-operated computing devices, enabling a user to managing the output of notifications faster and more efficiently conserves power and increases the time between battery charges.

At block 802, the electronic device detects one or more contextual parameters. In some examples, detected contextual parameters include one or more of a connection status of the device (e.g., whether the device is connected to another electronic device (e.g., second electronic device 608) having certain capabilities or characteristics), motion of the device (e.g., GPS data or Wi-Fi antenna data indicative of motion), or change in location of the device (e.g., GPS data indicative of a change in location).

In accordance with some embodiments, the contextual parameters include a connection status that indicates that the device is connected to a second electronic device (e.g., second electronic device 608) associated with the operating motor vehicle (e.g., operating motor vehicle 602) and the contextual parameters are indicative of the electronic device being situated within an operating motor vehicle (e.g., operating motor vehicle 602) (e.g., automobile, motorcycle, aircraft, boat, bicycle). In some examples, the device is connected to an application at the second electronic device (e.g., second electronic device 608) that can send and receive control signals with the device. In some examples, the device is wirelessly connected via Bluetooth and/or Wi-Fi to the second electronic device (e.g., second electronic device 608), and/or wire-connected via USB port and/or lightning cable to the second electronic device (e.g., second electronic device 608).

In accordance with some embodiments, the contextual parameters include a motion level that exceeds a threshold motion level and the contextual parameters are indicative of the electronic device being situated within an operating motor vehicle (e.g., operating motor vehicle 602). In some examples, the motion level is a rate of change of location coordinates detected at the device and the threshold motion level is a threshold rate of changing location coordinates. For example, the motion level is based on GPS or other location sensor information. In some examples, the motion level is a rate of change of Wi-Fi networks detected at the device and the threshold motion value is a threshold rate of changing Wi-Fi networks. For example, the device detects a number of Wi-Fi hotspots moving around and/or a number of distinct Wi-Fi networks over a predefined period of time. In some examples, the detected contextual parameter and/or corresponding criterion of the operational safety mode initiation criteria accounts for hysteresis to detect if, once the motion level falls below the threshold motion level, the motion level picks up again (e.g., during stop and go traffic).

In accordance with some embodiments, the contextual parameters include a location status that indicates a change of location detected at the device and the contextual parameters are indicative of the electronic device being situated within an operating motor vehicle (e.g., operating motor vehicle 602). For example, a GPS navigation application at the device is outputting turn-by-turn instructions for driving to a destination.

In accordance with some embodiments, in response to detecting the one or more contextual parameters, the electronic device determines whether the detected one or more contextual parameters satisfy the operational safety mode initiation criteria. In some examples, in accordance with the determination that operational safety mode initiation criteria are satisfied, the device updates a third party application with a driving status. In some examples, in accordance with the determination that operational safety mode initiation criteria are satisfied, the device instructs a companion device (e.g., 100, 300, 500, and/or a smart watch) to mirror the operational safety mode. In some embodiments, the electronic device (e.g., device 600) determines if contextual parameters are indicative of the electronic device being situated within an operating motor vehicle using one or more techniques described in U.S. Provisional patent application Ser. No. 15/596,592.

In accordance with some embodiments, while the electronic device is in the operational safety mode, the device automatically exits the operational safety mode in accordance with a determination that operational safety mode initiation criteria are no longer satisfied. In some examples, the device receives a manual request to exit. For example, the device receives a user request to unlock the device during operational safety mode, and in response to the user request, provides an option to exit (e.g., FIG. 7A) the operational safety mode or to pause the operational safety mode, and unlocks accordingly. In some embodiments, the electronic device (e.g., device 600) determines if contextual parameters are indicative of the electronic device no longer being situated within an operating motor vehicle using one or more techniques described in U.S. Provisional patent application Ser. No. 15/596,592.

In accordance with some embodiments, while the electronic device is in a second mode that is not the operational safety mode, the device receives a second notification, and in response to receiving the second notification, without regard to whether the second notification satisfies the set of notification output criteria, the device causes output corresponding to the second notification. For example, the device operates in a default and/or normal mode where notifications are output.

At block 804, in accordance with the one or more contextual parameters satisfying operational safety mode initiation criteria, including a criterion that is satisfied when the contextual parameters are indicative of the electronic device being situated within an operating motor vehicle (e.g., operating motor vehicle 602), the electronic device initiates an operational safety mode. Initiating the operational safety mode in accordance with contextual parameters satisfying operational safety mode initiation criteria allows the user to quickly engage the operational safety mode at the device and enables the user to focus on operating a motor vehicle, thereby promoting safe usage of the device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently At block 806, while the device is in the operational safety mode, the electronic device receives a notification. For example, the device receives a notification and/or communication from an external device (e.g., external device 699, 689, 679). In some examples, the device receives a notification and/or alert that is internally generated, for example a calendar reminder notification and/or a system alert.

In accordance with some embodiments, at block 808, in response to receiving a notification, the electronic device determines whether the notification satisfies the set of notification output criteria.

In accordance with some embodiments, the set of notification output criteria includes a criterion that is satisfied when the notification is from an authorized source. For example, the authorized source is a whitelisted contact, an emergency contact, a favorites contact, an application that has output permission, and/or a prioritized application such as navigation app or a user-selected prioritized application.

In accordance with some embodiments, at block 810, the set of notification output criteria includes a criterion that is satisfied when the notification corresponds to a communication from a recently-communicated contact. For example, the recency of the contact is based on whether a phone, text, or any other active communication with the contact occurred in the past predetermined window of time (e.g., past 24 hours) since arrival of the communication, and/or since the most recent initiation of the operational safety mode at the device. Allowing notifications from a recent contact to be output while in the operational safety mode allows the user to stay informed while the user is on their way to meet the recent contact in some examples.

In accordance with some embodiments, at block 812, the set of notification output criteria includes a criterion that is satisfied when the notification corresponds to a communication from a contact that is authorized to receive location information from the device. For example, location sharing with the contact, and/or with an external device associated with the contact, is currently on and/or is granted permission. Allowing notifications to be output from a contact having location-sharing access while in the operational safety mode further promotes safe usage of the device while operating a vehicle by allowing the source of the incoming communication to determine whether to send the communication at a later time (e.g., in the event the source has ascertained the device's location) when the user is not operating the vehicle or whether the communication is important and relevant to the user at the time, thereby allowing the user to stay informed while still in operational safety mode.

In accordance with some embodiments, the set of notification output criteria includes a criterion that is satisfied when the notification corresponds to a communication that is a repeated communication from a single contact. For example, the communication is an incoming call that is a repeated call from a single contact.

In accordance with some embodiments, the set of notification output criteria includes a criterion that is satisfied when the notification corresponds to an incoming call and the device is connected to the second electronic device (e.g., second electronic device 608) associated with the operating motor vehicle (e.g., operating motor vehicle 602). In some examples, the incoming call is not suppressed in the operational safety mode when a detected contextual parameter is a connection status that indicates that the device is Bluetooth-integrated with the operating motor vehicle (e.g., operating motor vehicle 602). For example, the device permits answering calls (e.g., from any contact) with a button (e.g., physical button) that is provided on a steering wheel at the operating motor vehicle (e.g., operating motor vehicle 602).

In accordance with some embodiments, the set of notification output criteria includes a criterion that is satisfied when the notification corresponds to a communication from a contact associated with a calendar event that coincides with a window of time in which the device is in the operational safety mode. For example, the communication is an incoming message from a contact that is included in a meeting invite at or around the same time as the time that the operational safety mode is implemented at the device. In some examples, the criterion is further satisfied based on matching a location included in the meeting invite with a detected direction of travel at the device. Allowing notifications from a contact included in a coinciding meeting invite to be output while in the operational safety mode allows the user to stay informed while the user is on their way to a meeting with the contact in some examples.

In accordance with some embodiments, the set of notification output criteria includes a criterion that is satisfied when the notification corresponds to a system alert. For example, the system alert is a CMOS alert.

In accordance with some embodiments, the set of notification output criteria includes a criterion that is satisfied when the notification corresponds to an emergency alert. For example, the emergency alert is a government alert and/or weather alert.

At block 814, while the electronic device is in the operational safety mode, in accordance with a determination that the notification satisfies a set of notification output criteria, the device causes output corresponding to the notification. For example, the device issues a visual output (e.g., causes display of a notification on the display screen and/or at another display screen associated with the second electronic device (e.g., second electronic device 608), haptic output, and/or audible output.

At block 816, while the electronic device is in the operational safety mode, in accordance with a determination that the notification does not satisfy the set of notification output criteria, the device forgoes causing output corresponding to the notification. For example, the device suppresses the notification by preventing the notification from being displayed at the device, such as from appearing on a locked screen mode, and/or prevents audible or haptic outputs from being issued.

In accordance with some embodiments, in accordance with the determination that the notification does not satisfy the set of notification output criteria, the electronic device stores the notification. For example, unread notifications including notifications that did not satisfy the notification output criteria are stored for later retrieval in unlocked state.

Note that details of the processes described above with respect to method 800 (e.g., FIG. 8 are also applicable in an analogous manner to the methods described below. For example, method 900 optionally includes one or more of the characteristics of the various methods described above with reference to method 800. For example, method 900 can further include detecting one or more contextual parameters (e.g., block 802, FIG. 8) and/or in accordance with one or more contextual parameters satisfying operational safety mode initiation criteria, including a criterion that is satisfied when the contextual parameters are indicative of the electronic device being situated within an operating motor vehicle, initiating an operational safety mode (e.g., block 804, FIG. 8). For brevity, these details are not repeated below.

FIG. 9 is a flow diagram illustrating a method for an operational safety mode using an electronic device in accordance with some embodiments. Method 900 is performed at a device (e.g., 100, 300, 500) with a display. Some operations in method 900 are, optionally, combined, the order of some operations are, optionally, changed, and some operations are, optionally, omitted.

As described below, method 900 provides an intuitive way for implementing an operational safety mode that can include suppressing notifications for communications unless they include a sender-marked output request (e.g., an explicit request while the device is in an operational safety mode that otherwise suppresses notifications). The method reduces the cognitive burden on a user for managing the output of notifications. For battery-operated computing devices, enabling a user to managing the output of notifications faster and more efficiently conserves power and increases the time between battery charges.

At block 902, while in an operational safety mode, the electronic device receives a communication from a contact. For example, the communication is a text message, phone call, email, or other communication via a third-party application from the contact.

In accordance with some embodiments, while in operational safety mode, in response to receiving an indication of an incoming communication from a source and prior to receiving the incoming communication at the device, the electronic device sends a status to the source (e.g., to the source electronic device, which could be any of devices 100, 300, 500, and/or external device 699, 689, 679) indicating that the device is in the operational safety mode. Merely by way of example, the device sends a status such as a presence-indicator to the source indicating that the device is in the operational safety mode, that the user of the device is currently driving, and/or a location of the device. For example, the device receives an indication of a user typing a message in iMessage (e.g., short messages via services such as SMS and MMS, text messages via services such as iMessage® provided by Apple, Inc. of Cupertino, Calif.) at the user's device, and sends to the source device (e.g., external device 699, 689, 679) status information that causes display of the status (e.g., steering wheel icon and/or text such as, "User is currently driving"). In some examples, the device sends the status to any source of the indication of the incoming communication and/or to permitted sources (e.g., auto-reply sources) only. Sending the status to the source (e.g., external device 699, 689, 679) prior to receiving the incoming communication further promotes safe usage of the device while operating a vehicle by allowing the source of the incoming communication to determine whether to send the communication at a later time when the user is not operating the vehicle.

In accordance with some embodiments, at block 904, in response to receiving the communication from the contact, the electronic device determines whether the communication satisfies notification output criteria.

In accordance with some embodiments, while the electronic device is in a second mode that is not the operational safety mode, the device receives a second communication, and in response to receiving the second communication, without regard to whether the second communication satisfies the set of notification output criteria, the device causes output corresponding to the second communication.

In accordance with some embodiments, the notification output criteria include a criterion that is satisfied when the contact is a recent contact that was recently communicated within a past predetermined window of time. For example, recency of the contact is based on a phone or text communication that occurred in the past 24 hours. In some examples, after the contact's recency expires, the device receives another communication from the contact while the device is in operational safety mode, and forgoes outputting the notification regardless of whether the notification output request is included.

In accordance with some embodiments, the notification output criteria include a criterion that is satisfied when the contact is an authorized contact for selecting the notification output request for the communication. In some examples, the contact is authorized to include the notification output request if the contact received an auto-reply to a previous message. In some examples, the contact is authorized to include the notification output request if the contact is a user-designated contact (e.g., a whitelisted contact, no contact, favorites, recents, and/or all contacts).

In accordance with some embodiments, at block 906, the notification output criteria includes a criterion that is satisfied when the contact is an authorized contact for receiving an automatic reply from the device in response to a previous communication from the contact.

In accordance with some embodiments, the authorized contact is a recent contact that was recently communicated within a past predetermined window of time.

In accordance with some embodiments, the authorized contact is a user-designated authorized contact (e.g., a whitelisted contact, no contact, favorites, recents, and/or all contacts).

In accordance with some embodiments, the authorized contact is a contact that is authorized to receive current location information corresponding to the device. For example, the contact has location-sharing access to the device.

In accordance with some embodiments, the authorized contact is a contact associated with a calendar event that coincides with a window of time in which the device is in the operational safety mode. For example, the communication is an incoming message from a contact that is included in a meeting invite at or around the same time as the time that the operational safety mode is implemented at the device. In some examples, the criterion is further satisfied based on matching a location included in the meeting invite with a detected direction of travel at the device.

At block 908, while in an operational safety mode, in accordance with a determination that the communication satisfies notification output criteria, including a criterion that is satisfied when the communication includes a notification output request (e.g., an explicit request, selected at the sending device, that requests that the notification should be outputted), the electronic device outputs a notification corresponding to the communication. For example, the device displays the notification and/or issues an audible or haptic output.

At block 910, while in an operational safety mode, in accordance with a determination that the communication does not satisfy the notification output criteria, the electronic device forgoes outputting the notification.

In accordance with some embodiments, at block 912, in accordance with a determination that the communication is a first communication from the contact and the contact is an authorized contact for receiving an automatic reply from the device, while not satisfying the notification output criteria (e.g., forgoing outputting the notification), the electronic device sends an automatic reply to the external device associated with the contact. In some examples, the communication is a text message and the automatic reply is a text message. Sending an automatic reply allows the user at the device to avoid appearing unresponsive and in some cases further promotes safe usage of the device by informing the contact that is unavailable at the time (e.g., when the automatic reply indicates that user is currently driving), thereby allowing the contact to determine whether to continue attempting to reach the user now or at a later time.

In accordance with some embodiments, the automatic reply includes a current location (e.g., location waypoint) detected at the device in response to receiving the communication. In some examples, the automatic reply is user customizable for specific classes of contacts, for all contacts permitted to receive auto-replies, and/or for particular contact. In some examples, the automatic reply is single reply that is utilized for all permitted contacts.

In accordance with some embodiments, the automatic reply includes text indicating the device is in the operational safety mode. For example, the text indicates that the user is currently driving and/or notifications are currently suppressed at this time. In some examples, the text indicates other means for reaching the user if necessary (e.g., call to reach the user when Bluetooth integration is detected that allows incoming calls to be output).

In accordance with some embodiments, at block 914, while in the operational safety mode and subsequent to sending the automatic reply, the electronic device receives a second communication from the contact. In accordance with a determination that the second communication includes a second notification output request, the device outputs a second notification corresponding to the second communication, and in accordance with a determination that the second communication does not include the second notification output request, the device forgoes outputting the second notification. In some examples, the second communication is the first communication with a second notification output request. For example, the contact does not need to retype the previous message that did not get output, but only flags the previous message for output.

In accordance with some embodiments, while in the operational safety mode and subsequent to sending the automatic reply, the electronic device receives a third communication from the contact that does not include the notification output request and outputs a third notification corresponding to the third communication. For instance, in some examples the notification output request flags an entire conversation with the contact to be output during the current operational safety mode.

Note that details of the processes described above with respect to method 900 (e.g., FIG. 9 are also applicable in an analogous manner to the methods described above and below. For example, method 1000 optionally includes one or more of the characteristics of the various methods described above with reference to method 800. For example, method 1000 can include, while in an operational safety mode, receiving a communication from a contact (e.g., block 902, FIG. 9) and in accordance with a determination that the communication satisfies notification output criteria, including a criterion that is satisfied when the communication includes a notification output request, outputting a notification corresponding to the communication (e.g., block 908, FIG. 9). For brevity, these details are not repeated below.

FIG. 10 is a flow diagram illustrating a method for an operational safety mode using an electronic device in accordance with some embodiments. Method 1000 is performed at a device (e.g., 100, 300, 500) with a display. Some operations in method 1000 are, optionally, combined, the order of some operations are, optionally, changed, and some operations are, optionally, omitted.

As described below, method 1000 provides an intuitive way for implementing and/or otherwise initiating an operational safety mode. The method reduces the cognitive burden on a user for managing the output of notifications, thereby creating a more efficient human-machine interface. For battery-operated computing devices, enabling a user to manage the output of notifications faster and more efficiently conserves power and increases the time between battery charges.

At block 1002, while a first set of operational safety mode initiation criteria of a plurality of sets of operational safety mode initiation criteria is active, the first set of operational safety mode initiation criteria including a criterion that is satisfied when movement of the electronic device (e.g., a rate of motion, a rate of acceleration) exceeds a threshold movement value, the electronic device detects a first set of one or more contextual parameters. In some examples, the detected contextual parameters include one or more of a connection status of the device (e.g., whether the device is connected to another electronic device (e.g., second electronic device 608) having certain capabilities), motion of the device (e.g., GPS data or WiFi antenna data indicative of motion), or change in location of the device (e.g., GPS data indicative of a change in location).

At block 1004, while a first set of operational safety mode initiation criteria of a plurality of sets of operational safety mode initiation criteria is active, the first set of operational safety mode initiation criteria including a criterion that is satisfied when movement (e.g., motion level) of the electronic device (e.g., a rate of motion, a rate of acceleration) exceeds a threshold movement value (e.g., threshold motion level), in response to detecting the first set of one or more contextual parameters, and in accordance with a determination that the first set of contextual parameters satisfy the first set of operational safety mode initiation criteria, the electronic device initiates the operational safety mode. In some examples, the determination regarding the first set of contextual parameters is made without regard to whether a second set of operational safety mode initiation criteria is satisfied or not. In some embodiments, device 600 determines if contextual parameters are indicative of the electronic device being situated within an operating motor vehicle (e.g., determines whether the first set of operational safety mode initiation criteria are satisfied) using one or more techniques described in U.S. Provisional patent application Ser. No. 15/596,592.

In accordance with some embodiments, while the second set of operational safety mode initiation criteria is not active, and in accordance with the determination that the first set of operational safety mode initiation criteria is satisfied, the electronic device initiates the operational safety mode (e.g., connection criteria is inactive, and the vehicle is detected as moving). In accordance with the determination that the first set of operational safety mode initiation criteria is not satisfied, the device forgoes initiating the operational safety mode (e.g., connection criteria is inactive, and the vehicle is detected as not moving).

At block 1006, while a second set of operational safety mode initiation criteria of the plurality of sets of operational safety mode initiation criteria is active, the second set of operational safety mode initiation criteria including a criterion that is satisfied when the electronic device is connected to a second electronic device (e.g., second electronic device 608) associated with an operating motor vehicle (e.g., operating motor vehicle 602), the device detects a second set of one or more contextual parameters. In some examples, the second electronic device (e.g., second electronic device 608) is a device that is normally only present in or specific to motor vehicles (e.g., a receiver, head unit, car radio integrated at the motor vehicle, in-car technology and infotainment systems such as CarPlay® provided by Apple, Inc. of Cupertino, Calif.) such that detecting or connecting to that type of device is indicative that the device is located in the motor vehicle. In some examples, the second electronic device (e.g., second electronic device 608) includes an application or standard that is specific to motor vehicles that allows the second electronic device (e.g., second electronic device 608) to send and/or receive control signals with the device via wired or wireless connections, such as Bluetooth, Wi-Fi, and USB, and/or includes other features that facilitate linking the device, which may be a portable communications device such as a mobile phone, to the motor vehicle. In some examples, the detected contextual parameters include one or more of a connection status of the device (e.g., whether the device is connected to another electronic device having certain capabilities), motion of the device (e.g., GPS data or WiFi antenna data indicative of motion), or change in location of the device (e.g., GPS data indicative of a change in location).

At block 1008, while a second set of operational safety mode initiation criteria of the plurality of sets of operational safety mode initiation criteria is active, the second set of operational safety mode initiation criteria including a criterion that is satisfied when the electronic device is connected to a second electronic device (e.g., second electronic device 608) associated with a motor vehicle, in response to detecting the second set of one or more contextual parameters, and in accordance with a determination that the second set of contextual parameters satisfy the second set of operational safety mode initiation criteria, the device initiates the operational safety mode. For example, the device initiates the operational safety mode regardless of whether the first set of operational safety mode initiation criteria is active, inactive, satisfied, not satisfied, or any combination thereof. As discussed above, in some examples, the second electronic device (e.g., second electronic device 608) is a device that is normally only present in or specific to motor vehicles (e.g., a receiver, head unit, or car radio integrated at the motor vehicle) such that detecting or connecting to that type of device is indicative that the device is located in the motor vehicle.

In accordance with some embodiments, in accordance with the determination that the second set of contextual parameters satisfy the second set of operational safety mode initiation criteria, the electronic device initiates the operational safety mode without regard to whether the first set of operational safety mode initiation criteria is satisfied (e.g., connected and moving) or not satisfied (e.g., connected and not moving). In some examples, the device initiates the operational safety mode further without regard to whether the first set of operational safety mode initiation criteria (e.g., movement criteria) is active or inactive.

In accordance with some embodiments, while the electronic device is in the operational safety mode, the device receives a first notification. For example, the device receives a notification and/or communication from an external device (e.g., external device 699, 689, 679). In some examples, the device receives a notification and/or alert that is internally generated, for example a calendar reminder notification and/or a system alert. In accordance with a determination that the first notification satisfies a set of notification output criteria, the device causes output corresponding to the first notification. For example, the device issues a visual output (e.g., causes display of a notification on the display screen and/or at another display screen associated with the second electronic device (e.g., second electronic device 608), haptic output, and/or audible output. In accordance with a determination that the first notification does not satisfy the set of notification output criteria, the device forgoes causing output corresponding to the first notification. For example, the device suppresses the notification by preventing the notification from being displayed at the device and/or second electronic device, such as from appearing on a locked screen mode, and/or prevents audible or haptic outputs from being issued.

At block 1010, while a second set of operational safety mode initiation criteria of the plurality of sets of operational safety mode initiation criteria is active, the second set of operational safety mode initiation criteria including a criterion that is satisfied when the electronic device is connected to a second electronic device (e.g., second electronic device 608) associated with a motor vehicle, in response to detecting the second set of one or more contextual parameters, and in accordance with a determination that the second set of contextual parameters do not satisfy the second set of operational safety mode initiation criteria, while satisfying the first set of operational safety mode initiation criteria, the device forgoes initiating the operational safety mode. For example, a connection status of the device supersedes a movement level of the device in regard to whether to initiate the operational safety mode. As discussed above, in some examples, the second electronic device (e.g., second electronic device 608) is a device that is normally only present in or specific to motor vehicles (e.g., a receiver, head unit, or car radio integrated at the motor vehicle) such that detecting or connecting to that type of device is indicative that the device is located in the motor vehicle.

In accordance with some embodiments, in accordance with the determination that the second set of contextual parameters does not satisfy the second set of operational safety mode initiation criteria, the electronic device forgoes initiating the operational safety mode without regard to whether the first set of operational safety mode initiation criteria is satisfied or not satisfied. For example, the device forgoes initiating the operational safety mode when the device is not connected, regardless of whether the device is detected as moving or not moving. In some examples, the device forgoes initiating the operational safety mode further without regard to whether the first set of operational safety mode initiation criteria (e.g., movement criteria) is active or inactive.

In accordance with some embodiments, in response to detecting the second set of one or more contextual parameters, in accordance with a determination that the second set of contextual parameters do not satisfy the second set of operational safety mode initiation criteria, while not satisfying the first set of operational safety mode initiation criteria, the electronic device forgoes initiating the operational safety mode. For example, the second set of contextual parameters indicates the device is not connected and the first set of contextual parameters indicates the device is not moving.

In accordance with some embodiments, while both the first set of operational safety mode initiation criteria and the second set of operational safety mode initiation criteria are not active, in response to receiving a manual activation for initiating the operational safety mode, the electronic device initiates the operational safety mode, and in response to a lack of the manual activation, the device forgoes initiating the operational safety mode. For example, manual activation is turning the operational safety mode on through a control center or settings at the device.

In accordance with some embodiments, while the electronic device is in a second mode that is not the operational safety mode, the device receives a second notification, and in response to receiving the second notification, without regard to whether the second notification satisfies the set of notification output criteria, the device causes output corresponding to the second notification. For example, the device operates in a default and/or normal mode where notifications are output.

In accordance with some embodiments, while a manual setting for manually activating the operational safety mode is enabled, the device inactivates the first set of operational safety mode initiation criteria and the second set of operational safety mode initiation criteria. For example, the device inactivates based on a user setting the operational safety mode to manual activation through a control panel or control center. In some examples, manual activation deactivates any set triggers for entering operational safety mode.

In accordance with some embodiments, while the manual setting for the operational safety mode is not enabled, the first set of operational safety mode initiation criteria is active based on a first user selection and the second set of operational safety mode initiation criteria is active based on a second user selection. For example, users select a type of trigger to cause operational safety mode, such as connection-activated trigger versus automatic (motion level/speed-based) trigger. In some examples, connection-activated trigger detects whether the device is connected to in-car technology and infotainment systems, such as CarPlay® provided by Apple, Inc. of Cupertino, Calif.

In accordance with some embodiments, while neither the first set of operational safety mode initiation criteria and the second set of operational safety mode initiation criteria are active, subsequent to a second instance of initiating the operational safety mode in response to detecting an initial set of operational safety mode initiation criteria of the plurality of sets of operational safety mode initiation criteria, the electronic device receives user selection of the initial set of operational safety mode initiation criteria as not active. For example, the device receives user setting for inactivating both criteria. In some examples, the device sets both criteria as not active after receiving a number of selections for inactivation in response to a number of previous sessions engaging operational safety mode, the number exceeding a threshold number.

In accordance with some embodiments, while neither the first set of operational safety mode initiation criteria nor the second set of operational safety mode initiation criteria are active, subsequent to a first instance of initiating the operational safety mode in response to detecting an initial set of operational safety mode initiation criteria of the plurality of sets of operational safety mode initiation criteria are satisfied, the electronic device receives user selection of the initial set of operational safety mode initiation criteria as active, wherein the initial set of operational safety mode initiation corresponds to at least one of the first set of operational safety mode initiation criteria and the second set of operational safety mode initiation criteria. For example, the device enters an onboarding mode where, when no trigger has yet been set as active, the device presents an option to select the first detected trigger (detected contextual parameters that satisfy the first set of operational safety mode initiation criteria or the second set of operational safety mode criteria) as the active trigger. In some examples, the first instance of entering the operational safety mode is the first time that the device enters operational safety mode.

Note that details of the processes described above with respect to method 1000 (e.g., FIG. 10 are also applicable in an analogous manner to the methods described above. For example, method 800 optionally includes one or more of the characteristics of the various methods described above with reference to method 800. For example, method 800 can include, while a second set of operational safety mode initiation criteria of the plurality of sets of operational safety mode initiation criteria is active, the second set of operational safety mode initiation criteria including a criterion that is satisfied when the electronic device is connected to a second electronic device associated with a motor vehicle, detecting a second set of one or more contextual parameters (e.g., block 1006, FIG. 10), and/or in response to detecting the second set of one or more contextual parameters, in accordance with a determination that the second set of contextual parameters do not satisfy the second set of operational safety mode initiation criteria, while satisfying the first set of operational safety mode initiation criteria, forgoing initiating the operational safety mode (e.g., block 1010, FIG. 10). For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide safe operation, such as initiating an operational safety mode based on detected contexts, and managing notifications and communications during the operational safety mode to promote safe operation. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide operational safety mode and manage notifications and communications during operational safety. Accordingly, use of such personal information data enables users to calculated control of the operational safety mode and the notifications and communications during operational safety mode. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of operating vehicles, the present technology can be configured to allow users to select to "opt in" or "opt out" of participation in the collection of personal information data during registration for services or anytime thereafter. In another example, users can select not to provide user data (e.g., GPS data, input data, etc.) associated with operational safety mode. In yet another example, users can select to limit the length of time user data is maintained or entirely prohibit the development of a baseline operational safety mode profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, notifications can be managed by inferring preferences based on non-personal information data or a bare minimum amount of personal information, such as the content being requested by the device associated with a user, other non-personal information available to the device, or publicly available information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A electronic device, comprising:
a display;
one or more processors;
memory; and
one or more programs, wherein the one or more programs are stored in the memory and configured to be executed by the one or more processors, the one or more programs including instructions for:
detecting one or more contextual parameters;
in accordance with the one or more contextual parameters satisfying operational safety mode initiation criteria, including a criterion that is satisfied when the contextual parameters are indicative of the electronic device being situated within an operating motor vehicle, initiating an operational safety mode; and
while the device is in the operational safety mode:
receiving a notification;
in accordance with a determination that the notification satisfies a set of notification output criteria, causing output corresponding to the notification; and
in accordance with a determination that the notification does not satisfy the set of notification output criteria, forgoing causing output corresponding to the notification,
wherein the set of notification output criteria includes a criterion that is satisfied when the notification corresponds to a communication from a contact associated with a calendar event that coincides with a window of time in which the device is in the operational safety mode.

2. The electronic device of claim 1, the one or more programs further including instructions for:
in response to detecting the one or more contextual parameters, determining whether the detected one or more contextual parameters satisfy the operational safety mode initiation criteria.

3. The electronic device of claim 1, the one or more programs further including instructions for:
while the device is in a second mode that is not the operational safety mode:
receiving a second notification; and
in response to receiving the second notification, without regard to whether the second notification satisfies the set of notification output criteria, causing output corresponding to the second notification.

4. The electronic device of claim 1, wherein the contextual parameters include a connection status that indicates that the device is connected to a second electronic device associated with the operating motor vehicle and the contextual parameters are indicative of the electronic device being situated within an operating motor vehicle.

5. The electronic device of claim 1, wherein the contextual parameters include a motion level that exceeds a threshold motion level and the contextual parameters are indicative of the electronic device being situated within an operating motor vehicle.

6. The electronic device of claim 1, wherein the contextual parameters include a location status that indicates a change of location detected at the device and the contextual parameters are indicative of the electronic device being situated within an operating motor vehicle.

7. The electronic device of claim 1, the one or more programs further including instructions for:
while the device is in the operational safety mode, automatically exiting the operational safety mode in accordance with a determination that operational safety mode initiation criteria are no longer satisfied.

8. The electronic device of claim 2, the one or more programs further including instructions for:
in response to receiving a notification, determining whether the notification satisfies the set of notification output criteria.

9. The electronic device of claim 1, the one or more programs further including instructions for:
in accordance with the determination that the notification does not satisfy the set of notification output criteria, storing the notification.

10. The electronic device of claim 1, wherein the set of notification output criteria includes a criterion that is satisfied when the notification is from an authorized source.

11. The electronic device of claim 1, wherein the set of notification output criteria includes a criterion that is satisfied when the notification corresponds to a communication from a contact that is authorized to receive location information from the device.

12. The electronic device of claim 1, wherein the set of notification output criteria includes a criterion that is satisfied when the notification corresponds to a communication from a recently-communicated contact.

13. The electronic device of claim 1, wherein the set of notification output criteria includes a criterion that is satisfied when the notification corresponds to a communication that is a repeated communication from a single contact.

14. The electronic device of claim 1, wherein the set of notification output criteria includes a criterion that is satisfied when the notification corresponds to an incoming call and the device is connected to the second electronic device associated with the operating motor vehicle.

15. The electronic device of claim 1, wherein the set of notification output criteria includes a criterion that is satisfied when the notification corresponds to a system alert.

16. The electronic device of claim 1, wherein the set of notification output criteria includes a criterion that is satisfied when the notification corresponds to an emergency alert.

17. A non-transitory computer-readable storage medium storing one or more programs configured to be executed by one or more processors of an electronic device with a touch-sensitive display, the one or more programs including instructions for:

detecting one or more contextual parameters;

in accordance with the one or more contextual parameters satisfying operational safety mode initiation criteria, including a criterion that is satisfied when the contextual parameters are indicative of the electronic device being situated within an operating motor vehicle, initiating an operational safety mode; and while the device is in the operational safety mode:
receiving a notification;
in accordance with a determination that the notification satisfies a set of notification output criteria, causing output corresponding to the notification; and
in accordance with a determination that the notification does not satisfy the set of notification output criteria, forgoing causing output corresponding to the notification,
wherein the set of notification output criteria includes a criterion that is satisfied when the notification corresponds to a communication from a contact associated with a calendar event that coincides with a window of time in which the device is in the operational safety mode.

18. The non-transitory computer-readable storage medium of claim 17, the one or more programs further including instructions for:

in response to detecting the one or more contextual parameters, determining whether the detected one or more contextual parameters satisfy the operational safety mode initiation criteria.

19. The non-transitory computer-readable storage medium of claim 17, the one or more programs further including instructions for:

while the device is in a second mode that is not the operational safety mode:
receiving a second notification; and
in response to receiving the second notification, without regard to whether the second notification satisfies the set of notification output criteria, causing output corresponding to the second notification.

20. The non-transitory computer-readable storage medium of claim 17, wherein the contextual parameters include a connection status that indicates that the device is connected to a second electronic device associated with the operating motor vehicle and the contextual parameters are indicative of the electronic device being situated within an operating motor vehicle.

21. The non-transitory computer-readable storage medium of claim 17, wherein the contextual parameters include a motion level that exceeds a threshold motion level and the contextual parameters are indicative of the electronic device being situated within an operating motor vehicle.

22. The non-transitory computer-readable storage medium of claim 17, wherein the contextual parameters include a location status that indicates a change of location detected at the device and the contextual parameters are indicative of the electronic device being situated within an operating motor vehicle.

23. The non-transitory computer-readable storage medium of claim 17, the one or more programs further including instructions for:

while the device is in the operational safety mode, automatically exiting the operational safety mode in accordance with a determination that operational safety mode initiation criteria are no longer satisfied.

24. The non-transitory computer-readable storage medium of claim 17, the one or more programs further including instructions for:

in response to receiving a notification, determining whether the notification satisfies the set of notification output criteria.

25. The non-transitory computer-readable storage medium of claim 17, the one or more programs further including instructions for:

in accordance with the determination that the notification does not satisfy the set of notification output criteria, storing the notification.

26. The non-transitory computer-readable storage medium of claim 17, wherein the set of notification output criteria includes a criterion that is satisfied when the notification is from an authorized source.

27. The non-transitory computer-readable storage medium of claim 17, wherein the set of notification output criteria includes a criterion that is satisfied when the notification corresponds to a communication from a contact that is authorized to receive location information from the device.

28. The non-transitory computer-readable storage medium of claim 17, wherein the set of notification output criteria includes a criterion that is satisfied when the notification corresponds to a communication from a recently-communicated contact.

29. The non-transitory computer-readable storage medium of claim 17, wherein the set of notification output criteria includes a criterion that is satisfied when the notification corresponds to a communication that is a repeated communication from a single contact.

30. The non-transitory computer-readable storage medium of claim 17, wherein the set of notification output criteria includes a criterion that is satisfied when the notification corresponds to an incoming call and the device is connected to the second electronic device associated with the operating motor vehicle.

31. The non-transitory computer-readable storage medium of claim 17, wherein the set of notification output criteria includes a criterion that is satisfied when the notification corresponds to a system alert.

32. The non-transitory computer-readable storage medium of claim 17, wherein the set of notification output criteria includes a criterion that is satisfied when the notification corresponds to an emergency alert.

33. A method comprising:

at an electronic device with a display:
detecting one or more contextual parameters;
in accordance with the one or more contextual parameters satisfying operational safety mode initiation criteria, including a criterion that is satisfied when the contextual parameters are indicative of the electronic device being situated within an operating motor vehicle, initiating an operational safety mode; and
while the device is in the operational safety mode:
receiving a notification;

in accordance with a determination that the notification satisfies a set of notification output criteria, causing output corresponding to the notification; and in accordance with a determination that the notification does not satisfy the set of notification output criteria, forgoing causing output corresponding to the notification, wherein the set of notification output criteria includes a criterion that is satisfied when the notification corresponds to a communication from a contact associated with a calendar event that coincides with a window of time in which the device is in the operational safety mode.

34. The method of claim 33, further comprising:

in response to detecting the one or more contextual parameters, determining whether the detected one or more contextual parameters satisfy the operational safety mode initiation criteria.

35. The method of claim 33, further comprising:

while the device is in a second mode that is not the operational safety mode:

receiving a second notification, and in response to receiving the second notification, without regard to whether the second notification satisfies the set of notification output criteria, causing output corresponding to the second notification.

36. The method of claim 33, wherein the contextual parameters include a connection status that indicates that the device is connected to a second electronic device associated with the operating motor vehicle and the contextual parameters are indicative of the electronic device being situated within an operating motor vehicle.

37. The method of claim 33, wherein the contextual parameters include a motion level that exceeds a threshold motion level and the contextual parameters are indicative of the electronic device being situated within an operating motor vehicle.

38. The method of claim 33, wherein the contextual parameters include a location status that indicates a change of location detected at the device and the contextual parameters are indicative of the electronic device being situated within an operating motor vehicle.

39. The method of claim 33, further comprising:

while the device is in the operational safety mode, automatically exiting the operational safety mode in accordance with a determination that operational safety mode initiation criteria are no longer satisfied.

40. The method of claim 33, further comprising:

in response to receiving a notification, determining whether the notification satisfies the set of notification output criteria.

41. The method of claim 33, further comprising:

in accordance with the determination that the notification does not satisfy the set of notification output criteria, storing the notification.

42. The method of claim 33, wherein the set of notification output criteria includes a criterion that is satisfied when the notification is from an authorized source.

43. The method of claim 33, wherein the set of notification output criteria includes a criterion that is satisfied when the notification corresponds to a communication from a contact that is authorized to receive location information from the device.

44. The method of claim 33, wherein the set of notification output criteria includes a criterion that is satisfied when the notification corresponds to a communication from a recently-communicated contact.

45. The method of claim 33, wherein the set of notification output criteria includes a criterion that is satisfied when the notification corresponds to a communication that is a repeated communication from a single contact.

46. The method of claim 33, wherein the set of notification output criteria includes a criterion that is satisfied when the notification corresponds to an incoming call and the device is connected to the second electronic device associated with the operating motor vehicle.

47. The method of claim 33, wherein the set of notification output criteria includes a criterion that is satisfied when the notification corresponds to a system alert.

48. The method of claim 33, wherein the set of notification output criteria includes a criterion that is satisfied when the notification corresponds to an emergency alert.

* * * * *

UNITED STATES PATENT AND TRADEMARK OFFICE
CERTIFICATE OF CORRECTION

PATENT NO. : 10,382,369 B2
APPLICATION NO. : 16/279686
DATED : August 13, 2019
INVENTOR(S) : Emily Clark Schubert et al.

Page 1 of 1

It is certified that error appears in the above-identified patent and that said Letters Patent is hereby corrected as shown below:

In Column 63, Line 23, Claim 35, delete "notification," and insert -- notification; --, therefor.

Signed and Sealed this
First Day of October, 2019

Andrei Iancu
*Director of the United States Patent and Trademark Office*